(12) United States Patent
Petri et al.

(10) Patent No.: US 12,269,628 B2
(45) Date of Patent: Apr. 8, 2025

(54) ADAPTIVE FLOW MEASUREMENT SYSTEM

(71) Applicant: Heat and Control, Inc., Hayward, CA (US)

(72) Inventors: Kenneth C. Petri, Richardson, TX (US); Paul Blake Svejkovsky, Mabank, TX (US)

(73) Assignee: HEAT AND CONTROL, INC., Hayward, CA (US)

( * ) Notice: Subject to any disclaimer, the term of this patent is extended or adjusted under 35 U.S.C. 154(b) by 537 days.

(21) Appl. No.: 17/614,694

(22) PCT Filed: May 28, 2020

(86) PCT No.: PCT/US2020/034979
§ 371 (c)(1),
(2) Date: Nov. 29, 2021

(87) PCT Pub. No.: WO2020/243347
PCT Pub. Date: Dec. 3, 2020

(65) Prior Publication Data
US 2022/0161947 A1    May 26, 2022

Related U.S. Application Data

(60) Provisional application No. 62/853,465, filed on May 28, 2019.

(51) Int. Cl.
*B65B 1/32* (2006.01)
*A23P 20/10* (2016.01)
(Continued)

(52) U.S. Cl.
CPC ............... *B65B 1/32* (2013.01); *A23P 20/10* (2016.08); *G01G 11/12* (2013.01); *G01G 13/08* (2013.01);
(Continued)

(58) Field of Classification Search
CPC .......... B65B 1/32; G01G 19/32; G01G 11/12; G01G 15/001; G01G 19/387; G01G 23/01;
(Continued)

(56) References Cited

U.S. PATENT DOCUMENTS 2,997,205 A * 8/1961 Schuerger ............ G01G 11/006
222/1
2018/0274970 A1* 9/2018 Nagai ................... G01G 19/393

FOREIGN PATENT DOCUMENTS

DE   102011051254 A1 * 12/2012  .......... G01G 11/046
JP      H0257159 A   *  2/1990

* cited by examiner

*Primary Examiner* — Patrick Assouad
*Assistant Examiner* — Julia Fitzpatrick
(74) *Attorney, Agent, or Firm* — Patrick K. Steele

(57) ABSTRACT

A method and system for correcting mass flow rate measurements relating to a conveyor used to move a stream of first component material portions to and through a mixing station in which a second component material is dispensed in a predetermined mass percentage of the mass of the first component material portions. The correction of the measurements is adapted to correct for inaccuracies that arise in the measurements due to, for example, differences in the first component material portions properties, differences in the second component material properties, environmental conditions, drift of electronic instruments, and changing conditions that occur during extended use of an upstream conveyor that delivers first component material portions to the mixing station.

6 Claims, 8 Drawing Sheets

(51) Int. Cl.
*G01G 11/12* (2006.01)
*G01G 13/08* (2006.01)
*G01G 15/00* (2006.01)
*G01G 19/32* (2006.01)
*G01G 19/387* (2006.01)

(52) U.S. Cl.
CPC ........... *G01G 15/001* (2013.01); *G01G 19/32* (2013.01); *G01G 19/387* (2013.01)

(58) Field of Classification Search
CPC ...... G01G 11/006; G01G 13/08; G01G 19/38; G01G 15/00; G01G 11/00; A23P 20/10
See application file for complete search history.

ADAPTIVE FLOW MEASUREMENT SYSTEM

STATEMENT OF RELATED APPLICATIONS

This application depends from and claims priority to PCT/US2020/034979 entitled Adaptive Flow Measurement System filed on May 28, 2020, which depends from and claims priority to U.S. Provisional Application No. 62/853,465 filed on May 28, 2019.

BACKGROUND

Field of the Invention

The present invention relates to the measurement of the flow rates at which a plurality of component materials combined to produce a multi-component blend of materials are introduced into a continuous mixing process. More specifically, the present invention relates to a method and system of improving the accuracy of the measurement of the rates at which a first component material is introduced into a mixing process to be combined with a second component material to produce a blend of the two component materials (or more than two) having a controlled amount of each component material therein. The invention provides for correcting measurements into which errors are introduced by variables that impact the equipment and by variables attributable to the physical properties of the component materials.

Background of the Related Art

Many products are blends of a plurality of product components. For example, plastics are often produced in bulk as blends of different plastic material components in the form of beads or pellets. A first plastic component material is mixed with a second plastic component to produce a blend having a predetermined weight percentage of the first plastic component material and a predetermined percentage of the second plastic component material. The weight percentages of the first and second component materials in the blend are predetermined to produce specific properties of the final plastic product that can be made using the engineered blend. The blend may be packaged in bags or bins and then shipped to a facility for use by the end user where the blend is processed by, for example, heating the beads, melting for softening the beads and pressing the melted or softened beads into shaped plastic products.

Another product that is often a blend of component materials that are mixed in predetermined amounts of each of the components is processed food. Some food products such as, for example, potato chips, candies, cereals or pretzels, are produced by dispensing one or more flavoring agents such as, for example, but not limited to, sugar, oil, salt and/or other flavoring agents, onto a stream of individual food portions conveyed through a flavoring station in which the flavoring agents are added. "Flavoring agents," as that term is used in connection with food products, may refer to a granular or powdered solid or liquid food component that is added to a stream of raw food portions to produce a blended food product or a finished food product. "Raw," as that term is used in connection with food products, means an unflavored or unmixed food component, and does not mean that the "raw" food portions are uncooked or otherwise not already treated or heated/cooked in a manner that makes them suitable for mixing with other food components (flavoring agents) to produce a flavored food product that is ready for consumption. Each container (bag, box, etc.) of the flavored food products may be comprised of a plurality of food portions that are uniformly mixed or blended with one or more additional food components that are added in a predetermined amount, and the weight of the flavored food product that is attributable to the raw food portions remains in a specific ratio to the weight of the flavored food portion that is attributable to the one or more flavoring agents that are added to the raw food portions to produce the final product. Just as the components of the plastic blends are selected and added in amounts to produce certain desirable properties in the final plastic product, components of flavored food portions are selected and added to raw food portions in amounts to produce a certain flavor to enhance consumer satisfaction and enjoyment of the final food product. Returning to the example of potato chips, the flavoring of the individual food portions (cooked but yet unflavored potato slices) involves conveying a stream of the food portions using one or more conveyors to continuously move the food portions to a flavoring station where one or more flavoring agents are dispensed onto the food portions in a uniform and consistent manner and at a rate to produce a predetermined weight percentage of the food portions (potato chips) and a predetermined weight percentage of the flavoring agents (oil, salt and flavoring agents such as, for example, spices in the form of powders). Afterwards, the flavored food portions are discharged from the flavoring station to a high-speed weighing and bagging machine that deposits a predetermined weight amount of flavored food portions in each bag.

It will be understood that high-fidelity weighing machines are very expensive, and that some component materials must be distributed using conveyors to a plurality of different areas of a facility having a plurality of mixing stations for separately adding a plurality of second component materials to the distributed streams of the first component material to create blends having different properties, flavors, etc. It will be further understood that weighing machines of the kind that can be used to determine the mass of conveyed first component materials are not highly accurate, and that the use of high-fidelity weighing machines at every location where mass measurements are made is cost prohibitive. Embodiments of the method and system of the present invention can, therefore, be used where a highly reliable high-fidelity weighing machine is used to measure the total mass of a blended product, and two or more less reliable weighing machines or dispensers are used to measure the total weight of the component materials that are measured and then mixed, and the reliability of the high-fidelity weighing machine is used to continuously correct inaccuracies in the less reliable two or more weighing machines and dispensers that measure the total weight of the component materials mixed together to create the blended product.

The first component material portions of a blend to be produced, which may be, for example, raw food portions, may be conveyed to a mixing station in which a second component material, which may be, for example, a powdered sour cream and onion flavoring material, is added at a predetermined percentage of the measured total mass of the first component material crossing the upstream weighing machine. The conveyor may be a conveyor that includes an upstream weighing machine that enables the measurement of the mass flow rate at which the first component material (raw food portions) is conveyed to the flavoring station such as, for example, a differential impulse conveyor. If the first component material is fragile, such as potato chip, care should be taken to avoid excessive stacking of the food portions in the trough of the conveyor to the extent that the weight applied to the food portions on the bottom of a stack or stream in the trough would be damaged or broken. The first component material may be conveyed to the station where the second component material is applied, and then the blend is discharged from the mixing station to a high-fidelity weighing machine. Using the example of potato chips, the weighing and bagging machine may be an Ishida® high-speed weighing and bagging machine that automatically deposits a predetermined weight amount of the flavored food portions, for example, 48 grams, into each package or bag. For products that are subject to spoiling due to prolonged exposure to the environment, the packages or bags may then be then sealed to maintain product freshness and then shipped for distribution and sale to consumers and end users. Other high-fidelity weighing machines, whether or not they are combined with machines for bagging or packaging the products, can also be used. Such high-fidelity weighing machines are equipped with processors to monitor and control the weighing (and, optionally, bagging or packaging) process, and these very expensive machines are highly accurate and consistent in the amount of mass of the final product introduced into each bag and the number of bags produced. Weighing and bagging machines produced by Ishida and other high-fidelity weighing machines may provide highly accurate data that can be used and relied upon in embodiments of the method and system of the present invention for harmonization of the measurement of the rate at which the first component material portions are conveyed to the station and the measurement of the rate at which the second material component is added to the first component material portions in the mixing station. The high-fidelity weighing machines provide accurate mass measurements that can be used to determine correction factors for correcting the measurements of other, less accurate and substantially less costly machines that may be used to determine the mass of component materials that are mixed to create a blend which is then weighed by the highly accurate machine.

BRIEF SUMMARY

It can be difficult to precisely measure the total mass or the mass flow rate at which a conveyed stream of first component material portions, such as a stream of raw food portions, moves along a conveyor to a mixing station in which a second component material is added to the stream of first component material portions at a predetermined percentage. The size, texture and weight of the individual portions of the first component material portions may vary. These properties may impact the manner and rate at which the stream of first component material portions moves on a differential impulse conveyor to the mixing station where the second component material is added to the first component material portions in predetermined weight percentage amounts. Referring back to the example in which the first component material portions are potato chips, an upstream conveyor can be used to move a stream of unflavored (or "raw") food portions to the mixing station where one or more flavoring agents are dispensed onto the stream of food portions at a predetermined percentage mass rate. Large chips with ridges may move differently on a conveyor than smaller chips without ridges. Thicker chips may move differently on a conveyor than thinner chips. Similarly, one granular flavoring agent may be dispensed from a flavoring agent dispenser differently than a second granular flavoring agent with different ingredients, grain sizes, particle sizes or gran or particle shapes. Similarly, in the example of blended plastic feedstocks, plastic beads of a first size and texture may move differently on a conveyor than plastic beads of a second size and texture. Conventional methods of measuring the total mass or the mass flow rate of items moving on a conveyor do not adjust or correct for these and other variables, and inaccuracies in mixing and blending may occur as a result.

The total mass or the mass flow rate of a stream of a first component material portions can be measured using weighing machines that are integrated into a conveyor. A weighing section of an upstream conveyor on which a stream of first component material portions (such as, for example, food portions) moved on the upstream conveyor to mixing station (such as, for example, a flavoring station) at which a second material component is added to the stream of first component material portions may include a conveyor section with load sensors coupled intermediate the conveyor section and the adjacent supporting portions of the upstream conveyor. Also, the speed at which the stream of first component material portions moves on the upstream conveyor and across the weighing section can be determined either by observation or by use of speed sensors that monitor the movement of the first component material portions on the upstream conveyor. Similarly, the time interval between the time that the leading portions of the first component material portions leave the weighing section of the upstream conveyor and the time that the same first component material portions are discharged from the upstream conveyor to enter the mixing station, and the time interval between the time that the leading portions of the first component material portions are discharged from the upstream conveyor into the station to be combined with the second component material (residence time) can be observed and recorded. As will be discussed in more below, these time intervals can be used to harmonize highly accurate mass data obtained from the high-fidelity weighing machine that receives the final product from the mixing station with less-accurate data obtained from the second component material dispenser in the mixing station and from data obtained using the upstream weighing machine of the upstream conveyor and speed sensors or observations made at the upstream conveyor.

In order to improve a blending process by improving the accuracy with which the mass of a stream of first component material portions conveyed to a mixing station is measured, and the accuracy with which the mass of a second component material added to the stream of first component material portions is measured, it is important to identify the sources of mass data that are most reliable, and then to use that favorable reliability in correcting those mass measurements that are determined to be less reliable or insufficiently accurate. For example, the type of high-speed high-fidelity weighing and bagging machines that are available for depositing a predetermined mass amount of flavored food portions (i.e., a blend) into bags are highly reliable. These machines are accurate to within ±0.1 grams of product where the weight of the product deposited into each bag is targeted to be, for example, 48 grams. These high-fidelity weighing machines can rapidly and efficiently produce thousands of sealed bags, each containing a targeted weight of the product, at a very high rate of production. One particular high-fidelity weighing and bagging machine is the R-type machines available from Ishida Co., Ltd. of Kyoto, Japan. More information about Ishida Co., Ltd. and these high-fidelity weighing and bagging machines is available at www.ishida.com. High-fidelity weighing machines are highly complex, and generally include a large number of circumferentially distributed bins with load cells coupled intermediate the bins into which the blended product is deposited and the supports for each bin. The load cell coupled to each bin of the high-fidelity weighing machine can detect when the predetermined mass amount of the blended product is received into the bin, and each load cell can generate a signal to a processor corresponding to the load on the load cell. The bins are of a known mass, and when the processor/load cell combination detects that the desired mass of the blend of the first component material portions and the second component material dispensed thereon has been received into the bin, a signal is sent by the processor that terminates further filling of the bin. For example, the signal may activate an actuator that closes a door above the bin. A signal may also be sent to activate an actuator that opens a lower door to dump the predetermined mass of the blend from the bin into a bag positioned to receive the predetermined mass amount of the blend and, for blends that may spoil or degrade due to exposure, the bag may be sealed to maintain freshness. A high-fidelity weighing machine may include dozens of such bins, all independently working and each used repeatedly to isolate and weigh a predetermined mass amount of the blend and to dump the predetermined mass amount into to a bag within a very few seconds. While the Ishida high-fidelity weighing and bagging machine described above is used for a blend comprising potato chips (first component material portions) and flavoring agents (second component material) dispensed thereon, it will be understood that machines can be provided for weighing other blends with equal accuracy and efficiency.

In addition to depositing a known mass amount of a blend into each bin and dumping the bin into a bag, container or package positioned to receive the predetermined mass amount of the blend, the high-fidelity weighing machine includes one or more processors that can be used to determine the number of bags, containers or packages of the blend produced within a given time interval. That number times the mass of the blend deposited into each bag, container or package can be used to provide the total mass of the blend discharged from the mixing station to the high-fidelity weighing machine during a time interval of interest, which is equal to the total mass of first material component portions plus the total mass of the second component material mixed therewith to produce the blend. Alternately, one or more processors can be used to determine the number of bags, containers or packages produced and an average weight of the bags, and this data can be used to determine a total mass of the blend discharged from the mixing station to the high-fidelity weighing machine. The high-fidelity weighing machine serves as a very reliable source of data that can be used to correct and to harmonize independent measurements of the total mass of the first component material portions discharged from an upstream conveyor to the mixing station during a corresponding time interval and an individual measurement of the total mass of the second component material dispensed by a loss-of-weight dispenser and added to the first component material portions discharged from the upstream conveyor to the mixing station during a corresponding time interval of interest.

The upstream weighing machine is illustrated in the appended drawings as a conveyor section coupled to load cells to measure the combined weight of the conveyor section and the first component material portions residing thereon, but these illustrations are not to be taken as limiting of the invention. Weighing machines with multiple load cells coupled to multiple conveyor sections of the upstream conveyor across which first component material portions are conveyed can also be used along with a detected speed of movement of the first component material portions along the upstream conveyor to determine a total mass amount of the first component material portions delivered to the mixing station during a time interval of interest. Embodiments of the method and system of the present invention disclosed herein can be used to correct the measurements obtained using a single upstream weighing machine or using a plurality of upstream weighing machines included within the upstream conveyor, and to correct measurements obtained using a loss-of-weight dispenser of the second component material in the mixing station.

The upstream weighing machine of the upstream conveyor that moves the first component material portions to the mixing station includes one or more load sensors. Similarly, the high-speed weighing machine that receives the blend of the first component material portions and the second component material discharged from the mixing station includes one or more load sensors for each bin into which a predetermined mass of the blend is deposited. Each load sensor detects a load and generates one or more signals corresponding to the detected load. The signals are directed, either by wire or wirelessly, to a processor. For example, but not by way of limitation, the weight of an upstream conveyor section supported by one or more load sensors is known, and the one or more load sensors generate signals that indicate the combined weight of the upstream conveyor section and the first component material portions supported thereon at a given time at which the measurement is made. The processor receives the signals and calculates the weight of the first component material portions on the upstream conveyor section by subtracting the weight of the upstream conveyor section from the detected load. Similarly, the load sensors of the high-speed weighing machine each generate signals that are transmitted to a processor. Those signals indicate the mass of the blend deposited into each bag, container or package and the total number of bags, containers or packages produced. Alternately, where the high-fidelity weighing machine is programmed to deposit an amount of the blend within a certain narrow mass range into each bin, the signals generated by the processor of the high-fidelity weighing machine may reflect only the number of bags, containers or packages produced during a given time interval since the average weight is already known. The signals generated by the load cells of the high-speed weighing machine can be used to determine the total mass of the blend discharged from the mixing station to the high-fidelity weighing machine within a given time interval of interest. It will be understood that the total mass of the blend discharged from the mixing station to the high-fidelity weighing machine has two components: the first component material portions and the second component material that is mixed at a known ratio with the first component material portions in the mixing station.

In some embodiments of the method and system of the present invention, speed sensors are provided and used to measure the speed at which first component material portions move along the upstream conveyor to the mixing station. A speed sensor can detect the speed of movement of the first component material portions in the upstream conveyor and generate a signal to a processor corresponding to the detected speed of movement. Alternately, the speed at which first component material portions move on the upstream conveyor can be easily observed by operations personnel and recorded, and that speed can be entered into a processor by operations personnel using a keypad or the like. These observations and/or these signals can be used with the signals from the upstream weighing machine to determine the total mass of the first component material portions moved along the upstream conveyor to the mixing station within a time interval of interest. These observations and/or these signals can also be used to determine the time interval that elapses from the time a plurality of first component material portions are weighed on the upstream weighing section to the time that the same plurality of first component material portions are discharged from the upstream conveyor to the mixing station or, alternately, to determine the time interval that elapses from the time a plurality of first component material portions enter the mixing station for mixing with the second component material to the time that the same plurality of first component material portions mixed with second component material are discharged from the mixing station to the high-fidelity weighing machine. These measured time intervals are important to enable data from the high-fidelity weighing machine to be correlated with data from the upstream weighing machine of the upstream conveyor and the loss-of-weight dispenser that dispenses the second component material onto the first component material in the station.

As stated above, the high-fidelity weighing machine is presumed to be highly accurate—the most reliable data source available in the system of the present invention. We can therefore use the highly-reliable data provided by the high-fidelity weighing machine to determine correction factors that can be applied to correct the total mass measurements of the first component material portions moving across the upstream weighing machine of the upstream conveyor in a time interval, and we can use the reliable data provided by the high-fidelity weighing machine to determine correction factors that can be applied to correct the total mass measurements of the second component material mixed into the first component material portions in the mixing station. The correction factors are determined by comparing the measured total mass of first component material portions moved across the upstream weighing machine to the mixing station during a time interval, determined using the measurements of the weight of a plurality of first material component portions on the upstream weighing machine, and the observed or detected speed at which the first component material portions are delivered by the upstream conveyor to the station, added to the measured total mass of the second component material mixed into the first component material portions discharged from the upstream conveyor to the station, with the total mass of first component material portions that are discharged from the mixing station to the high-fidelity weighing machine during a corresponding time interval of interest. Alternately, or in addition, comparison of the (corrected) mass of the plurality of first component material portions on the upstream weighing machine with the mass amount of the same plurality of first component material portions after mixing with a measured amount of second component material and after discharge from the mixing station to the high-fidelity weighing machine. Stated another way, the highly reliable and accurate data relating to the mass of blend produced and delivered to the high-fidelity weighing machine can be used to first correct the measurement of the total mass of first component material portions used to make the blend that was delivered to the high-fidelity weighing machine, and then used to correct the measurement of the total mass of the second component material added to and mixed with the first component material portions to make the blend.

Some embodiments of the method and system of the present invention include the use of an alternative and less expensive approach to the measurement of the total mass of first material component portions delivered to the mixing station for mixing with the second component material during a time interval of interest. The total mass at which first component material portions are delivered by the upstream conveyor to the mixing station can be measured by obtaining the height and/or the width of an interface of a stream of first component material portions moved within a trough of the upstream conveyor and the observed or detected speed at which the first component material portions move on the upstream conveyor to the mixing station for mixing with the second component material. The height interface is the height within the trough of the top surface of the stream of first component material portions in the upstream conveyor above the floor of the trough of the upstream conveyor. The width interface is the distance of an edge of the top surface of the stream of first component material portions where it meets a first side wall of the trough of the upstream conveyor to the opposite edge of the top surface where it meets the second, opposite side wall of the trough of the upstream conveyor. The measurement of either of the height interface and the width interface, along with the observed or detected speed at which the first component material portions are conveyed within the upstream conveyor, can be used to determine a volumetric flow rate at which the stream of first component material portions are conveyed by the upstream conveyor. It will be understood that the trough of the upstream conveyor, which may be, for example, semi-circular or (inverted) trapezoidal in the shape, is of a known and unchanging shape and dimensions. Measurement of either the height of the top interface or width of the top interface can be reliably correlated to a cross-sectional area of the stream of first component material portions moving within the trough of the upstream conveyor. That cross-sectional area can be multiplied by the observed or detected speed at which the stream of first component material portions moves within the upstream conveyor to determine a volumetric rate of flow of the first component material portions. That volumetric rate can be multiplied by an empirically determined density of the stream of first component material portions to determine a total mass or total mass flow rate of first component material portions discharged from the upstream conveyor to the mixing station within a time interval of interest. The mass flow rate of the first component material portions can be determined from this data using a processor, and the processor can be used to generate a signal to the dispenser that dispenses a second component material onto the first component material at a predetermined percentage of the mass flow rate in the mixing station.

Embodiments of the method and system of the present invention improve the accuracy of measurements of the total mass amount of a stream of first component material portions and/or for improving the accuracy of the measurement of the total mass amount of the second component material that is added to and mixed with the first component material portions in the mixing station, thereby resulting in an improvement of the quality and consistency of the blend that is ultimately discharged from the mixing station and then packaged in sealed bags, containers or packages, and then shipped and sold to consumers and end users.

One embodiment of the method and system of the present invention provides a computer-implemented method comprising the steps of providing an upstream conveyor to convey a stream of first component material portions to a station, the upstream conveyor having an upstream weighing machine including a conveyor section coupled to load sensors to weigh a plurality of the first component material portions residing thereon and supported on the upstream conveyor section, and to produce signals corresponding to the measurements obtained using the load sensors, providing a mixing station to receive the stream of first component material portions conveyed to the mixing station using the upstream conveyor and to dispense second component material onto the stream of first component material portions received into the mixing station from the upstream conveyor, the second component material added at a predetermined percentage of the total mass amount or mass flow rate of first component material portions measured using the upstream weighing machine, providing a high-fidelity weighing machine to reliably measure the total mass amount or mass flow rate of a blend of the first component material portions and second component material discharged from the mixing station.

The high-fidelity weighing machine (such as, for example, an Ishida weighing and bagging machine) may include a plurality of bins. A predetermined mass amount of the blend is deposited into each of the bins, and each bin is then automatically dumped to a bag, container or package. The product of the mass of blend deposited into each bag, container or package times the number of bags, containers or packages produced yields a highly accurate result for the total mass or total mass flow rate of the blend that is discharged from the mixing station to the high-fidelity weighing machine, which is the total mass of the first component material portions delivered by the upstream conveyor to the mixing station plus the total mass of the second component material added thereto in the mixing station during a time interval of interest.

Embodiments of the method and system of the present invention further include providing a dispenser to dispense the second component material onto the first component material portions received within the mixing station, the dispenser being adjustable or set up to dispense the second component material at a total mass amount or mass flow rate that is equal to a predetermined percentage of the total mass amount or mass flow rate at which the first component material portions are delivered to the mixing station by the upstream conveyor. The percentage mass flow rate at which the second component material is dispensed onto the first component material portions may be determined by the desired properties of the blend, by consumer satisfaction surveys and/or by tests. The device used to dispense the second component material may be automatically adjustable to enable the percentage of total mass amount or mass flow rate at which second component material is dispensed to be increased or decreased to achieve a desired blend of the first component material portions and the second component material. In one embodiment of the method and system of the present invention, the mixing station includes one or more continuous loss-of-weight dispensers having a second component material dispenser coupled to a hopper that is loaded with an initial charge of a second component material. The hopper and the second component material dispenser are coupled to one or more load sensors that detect the combined mass of the hopper, the charge of the second component material in the hopper and the dispenser coupled thereto, and the one or more load sensors generate one or more signals to a processor corresponding to the load detected by the one or more load sensors. As the second component material is dispensed onto the first component material portions delivered to the station by the upstream conveyor, the combined weight of the hopper, the remainder of the charge of second component material and the dispenser decreases by the amount of dispensed second component material and the change in mass at any given time can be used to determine the total mass amount dispensed or mass flow rate at which the second component material is dispensed onto the first component material portions delivered to the mixing station. It will be understood that loss-of-weight dispensers can be used to dispense second component materials that are powdered or granular, as well as second component materials that are liquid, to provide the mixture for the desired blend.

Some embodiments of the method and system of the present invention include the use of a dispenser that operates at a variable dispensation rate, and the total mass amount of the second component material or the mass rate at which the second component material is dispensed onto the first component material portions delivered to the station can be assumed based on, for example, performance data provided by the manufacturer of the dispenser and the mass flow rate at which the dispenser operates. For example, but not by way of limitation, some second component materials that may be powdered or granular are dispensed onto first component material portions using an augur that is rotated within an open-ended sleeve. Powdered or granular second component materials are loaded into a hopper that feeds an inlet end of the augur, and the augur rotates within the open-ended sleeve at a generally constant rate unless an increase or decrease is needed to provide the desired blend. The volume of the second component material that is displaced during a given time interval from the open end of the sleeve in this manner can be correlated (based on the density of the second component material) to the mass rate at which the second component material is dispensed onto the first component material portions.

Some embodiments of the method and system of the present invention enable the determination of a correction factor to be applied to the total mass amount or mass flow rate at which a dispenser dispenses second component materials onto a stream of first component material portions delivered to the mixing station by the upstream conveyor. Environmental and operational variables such as, for example, temperature, humidity, density of the second component material, consistency of the second component material and residue build-up on equipment can affect the accuracy of the total mass amount or mass flow rate measurements of dispensed second component materials. Some of these embodiments of the method of the present invention can be used to develop correction factors to be applied to the measured total mass amount or dispensation mass flow rate of dispensed second component material, as well as the total mass amount or mass flow rate measurement of first component material obtained using the upstream weighing machine, to bring these measurements into harmony with the more accurate downstream total mass amount or mass flow rate of the blend produced based on the measurements obtained using the high-fidelity weighing machine.

Embodiments of the method and system of the present invention may be used to measure total mass amount or mass flow rate and/or volumetric flow rate of the first component material during a time interval of interest and, using that data, to determine the total mass amount or mass flow rate of the first component material moved by the upstream conveyor to the mixing station during a time interval of interest for mixing with a second component material. Similarly, embodiments of the method and system of the present invention may be used to determine the total mass amount or mass flow rate of a second component material that is added to and mixed with the first component material in a mixing station during a time interval of interest to form a blend of the first component material and the second component material. Embodiments of the method and system of the present invention include the provision and use of equipment and instruments that enable the measurement of the total mass amount or mass flow rate at which the first component material is provided to the mixing station by the upstream conveyor during a time interval of interest and the total mass amount or mass flow rate of the second component material that is added to and mixed with the first component material in the mixing station during a time interval of interest. Finally, embodiments of the method and system of the present invention include the provision and use of a high-fidelity weighing machine that receives and accurately weighs the blend of the first component material and the second component material mixed therewith and discharged from the mixing station to the high-fidelity weighing machine during a time interval of interest. The equipment and instruments generate and send signals corresponding to the measurements made during those time intervals of interest, and those signals are received by a processor that compares the measurements. The processor then determines a corrective factor to be used to bring the measurements of the total mass amount or mass flow rate of the first component material delivered to the mixing station during a time interval of interest and a corrective factor to be used to bring the measurements of the total mass amount or mass flow rate of the second component material added to the first component material during a time interval of interest. These corrective factors enable more precise control over the relative amounts of the first component material and the second component material in the blend produced by the method and system and delivered to the high-fidelity weighing machine.

The equipment and instruments used to measure the total mass amount or mass flow rate of the first component material may vary. In one embodiment of the method and system of the present invention, the upstream conveyor that conveys a stream of the first component material to the mixing station includes a conveyor section of a known mass and one or more load cells disposed intermediate the conveyor section and adjacent supporting structures to detect the load imparted by the conveyor section and the first component material portions residing thereon at a given time of interest. These load cells may generate and send a signal to a processor corresponding to the detected load at predetermined time intervals such as, for example, every 250 milliseconds. The processor may receive and record this data. In addition, a speed sensor such as, for example, a laser-based speed sensor, may be used to detect and to generate and send signals corresponding to the speed at which the first component material portions move along the upstream conveyor to the mixing station. Alternately, the speed at which the first component material portions move along the upstream conveyor may be determined by observation. The processor may use the data received from the load cells coupled to the conveyor section and the speed data to determine the total mass of the first component material portions delivered to the mixing station during a time interval of interest.

Similarly, the equipment and instruments used to measure the total mass amount or mass flow rate of the second component material may vary. In one embodiment of the method and system of the present invention, the mixing station includes a loss-of-weight dispenser that had a hopper into which a charge of the second component material is placed, a dispenser that receives a supply of the second component material from the hopper and dispenses it onto the first component material portions delivered into the mixing station by the upstream conveyor, and one or more load cells that are coupled intermediate the hopper and dispenser and a support structure. The one or more load cells generate signals corresponding to the mass of the hopper, the dispenser and the second component material in the hopper. The signals may be generated and sent by the load cells at a predetermined time interval of, for example, every 250 milliseconds, to a processor that compares the signals and determines the change in mass of the hopper, dispenser and the second component material. The change in mass over a time interval of interest will represent the mass of the second component material dispensed from the hopper onto the first component material during the time interval of interest.

The high-fidelity weighing machine that receives the blend of the first component material and the second component material from the mixing station is highly accurate, and the high-fidelity weighing machine generates signals corresponding to the mass of the blend received during a time interval of interest. A processor may be used to compare the high-fidelity weighing machine measurement of the total mass amount of blend received at the high-fidelity weighing machine during a time interval of interest with the upstream weighing machine measurement of the total mass amount of the first component material delivered to the mixing station by the upstream conveyor during a corresponding time interval and the loss-of-weight dispenser measurement of the total mass amount of the second component material added to the first component material portions in the mixing station during a corresponding time interval. If the equipment and instrumentation used to measure the total mass amount of the first component material delivered to the mixing station by the upstream conveyor and to measure the total mass amount of the second component material added to the first component material portions in the mixing station during corresponding time intervals, then the sum of these two total mass amounts should theoretically equal the total mass amount of the blend received and measured by the high-fidelity weighing machine. However, if the measured total mass amount of the first component material portions delivered to the mixing station by the upstream conveyor to the mixing station during a time interval of interest and the measured total mass amount of the second component material added to the first component material portions in the mixing station during a corresponding time interval do not sum to the total mass amount of the blend received at the high-fidelity weighing machine during a corresponding time interval, then corrective factors may be determined that can be applied to one, the other or to both of the measurements of the total mass of the first component material portions delivered to mixing station and the second component material added thereto in the mixing station to bring these insufficiently accurate measurements into harmony with the measured total mass amount of the blend received into the high-fidelity weighing machine during a corresponding time interval of interest. Corrective factors generated in this manner may be used to compensate, for example, but not by way of limitation, for the difference in the size, shape, density, product bed profile, or texture of the first component material portions and how these properties may affect the movement of the first component material portions on the upstream conveyor that delivers the stream of first component material portions to the mixing station. Similarly, corrective factors generated in this manner may be used to compensate, for example, but not by way of limitation, for the difference in the granular or particle size, consistency, density, or texture of the second component material portions, and/or for the difference in humidity or temperature of the second component material and how these properties or conditions may affect the dispensation of the second component material portions onto the first component material portions delivered to the mixing station by the upstream conveyor. These corrective factors may also be used to compensate for other conditions such as, for example, but not by way of limitation, the build-up of residue on surfaces of the upstream conveyor, accuracy drift inherent to electronic-based load cell weighing devices, or the dispenser that affect the movement of the first component material portions or the dispensation of the second component material thereon.

The time intervals of interest may be strategically shifted one relative to the others for consistency. For example, equipment and instruments may be used, and/or observations may be made, to determine the amount of time required for first component material portions residing on the upstream weighing machine (conveyor section) at the time of a measurement to thereafter arrive in the mixing station. Similarly, for example, equipment and instruments may be used, and/or observations may be made, to determine the amount of time required for first component material portions delivered to the mixing station to be mixed with second component material dispensed thereon in the mixing station and to be thereafter discharged from the mixing station to the high-fidelity weighing machine. Corrective factors may then be determined based on the measurement taken by the high-fidelity weighing machine during a time interval of interest after these measurement are compared with measurements taken by the loss-of-weight dispenser in the mixing station during a time interval of equal duration but shifted by the amount of time that the first component material portions remain in the mixing station and with measurements taken by the upstream weighing machine of the upstream conveyor during a time interval of equal duration but shifted by the amount of time that the first component material portions require to move from the upstream weighing machine to the mixing station plus the time that these first component material portions reside in the mixing station before being discharged to the high-fidelity weighing machine. This time-shifting strategy enables the determination of more accurate correction factors because it minimizes the affect of variations in the rates at which first component material portions are delivered by the upstream conveyor to the mixing station. Similarly, the rate at which the loss-of-weight dispenser of the mixing station dispenses the second component material onto the first component material portions delivered to the mixing station by the upstream conveyor may be adjusted using the signal from the upstream weighing machine to ensure that the dispensation rate of the second component material is a predetermined fraction or multiple of the rate at which the first component material portions are, at that moment, being delivered into the mixing station by the upstream conveyor.

In one embodiment of the method and system of the present invention, corrective factors for the upstream weigher, corrective factors for the loss-of-weight dispenser, or both, are stored in a database and associated in the database with, for example, the specific type, shape, texture, character and/or other properties of the first component material portions, and are stored in a database and associated in the database with, for example, the specific type, granular or particulate size of the second component material or with the conditions under which it may be dispensed. This enables the retrieval and use of these corrective factors for future operations involving the production of the same blends. For example, but not by way of limitation, a future operation of the equipment can begin with the entry, using a keypad or other input device, of a code or descriptor of the specific first component material portions being conveyed to the mixing station by the upstream conveyor and a code or descriptor of the specific second component material portions being dispensed thereon in the mixing station. In addition, for example, instruments detecting the humidity or temperature in the facility may also be used to generate signals to a processor that uses these signals. A corrective factor for correcting the measurements made using the upstream weighing machine of the upstream conveyor that delivers the first component material portions to the mixing station and for correcting the measurements made using the loss-of-weight dispenser that dispenses the second component material onto to the first component material in the mixing station may be retrieved from a database and used at the onset of the operations of the equipment to maximize blend quality. This approach anticipates the direction and magnitude of the correction factors that may be necessary to condition the data for a particular first component material, a particular second component material and/or for particular conditions existing in the facility where the blend is produced.

Embodiments of the method and system of the present invention are adapted for automation. Measurements of time, mass and speed may be made using sensors and instruments, and signals corresponding to the measurements are generated by the sensors and instruments and delivered to a processor. The processor stores data relating to the measurements in a database for later retrieval and use. The processor performs calculations and compares measurements to settings, and the processor generates signals that adjust parameters such as feed rates of the first component material portions, the second component material mixed with the first component material portions, etc. The processor also receives input relating to the station being used to prepare the blend, the environmental conditions in the facility, the specific first component material portions, the second component material portions, etc., and the processor accesses a database and retrieves a starting correction factor for use in correcting the measurements of the total mass amount of the first component material portions delivered to the mixing station and a starting correction factor for use in correcting the measurements of the total mass amount of the second component material added to and mixed with the first component material portions in the mixing station. The processor also determines new correction factors using new measurements and stores these correction factors in the database at predetermined intervals for future reference and use.

In one embodiment of the method and system of the present invention, a distribution conveyor is provided for distributing streams of the first component material portions using proportional gates or valves that can be variably positioned using an actuator for increasing or decreasing the mass flow rate at which a stream of first component material portions are fed to an upstream conveyor that then conveys the stream first component material portions across an upstream weighing machine to a mixing station. The actuator of the proportional gate may be coupled to a processor to receive an initial call-for-product signal to position the proportional gate to an open position and the processor may receive signals thereafter for adjusting the position of the gate to increase or decrease the mass flow rate at which the first component materials are discharged to the upstream conveyor. The upstream conveyor includes an upstream weighing machine having load cells disposed intermediate a conveyor section of a known mass and support structures, and the load cells generate signals to a processor corresponding to the load imparted to the load cells by the conveyor section and the first component material portions residing thereon at a time of measurement. The signals may be sent in response to being prompted by the processor, and the processor may be programmed to prompt the load cells to generate and send signals at predetermined time intervals such as, for example, every 250 milliseconds. The processor may receive and interpret the signals according to the measurements to which the signals correspond, and the processor may then store the measurements in a database. The processor may also determine the time delay for the upstream weighing machine, which is the time elapsing from the positioning of the proportional gate to begin feeding a stream of first component material portions to the upstream conveyor until the time that the leading portions of the stream of first component material portions reaches the upstream weighing machine, as marked by abrupt increase in the load imparted to the load cells of the upstream weighing machine. A speed sensor may be provided to detect the speed of movement of the first component material portions on the upstream conveyor to a mixing station and to generate a signal to the processor corresponding to the detected speed. Alternately, the speed of movement of the stream of first component material portions may be observed and the observed speed may be entered into a keypad that generates a signal to the processor. The processor may receive and store the speed in a database. At predetermined time intervals, the processor may use the data to calculate the mass of first component material portions that have been delivered to the upstream conveyor, across the upstream weighing machine, into the mixing station and mixed with an amount of a second component material to create a blend, discharged from the mixing station and weighed using a high-fidelity weighing machine. The upstream conveyor is positioned to discharge the stream of first component material portions immediately downstream of the upstream weighing machine to a mixing station that includes a loss-of-weight dispenser for dispensing a second component material onto the stream of first component material portions delivered by the upstream conveyor. Unlike the load cell-based upstream weighing machine, the loss-of-weight dispenser of the mixing station generates a signal to the processor corresponding to the mass of the second component material dispensed to blend with the first component material portions delivered to the mixing station during a time interval of interest. The processor may be coupled to a keypad, and the keypad may be used to input a signal to the processor corresponding to the desired amount of second component material to be added to the first component material portions, and the processor may generate a signal to the loss-of-weight dispenser in the mixing station to dispense the second component material at a total mass amount or mass flow rate that is a desired percentage of the total mass amount or mass flow rate at which the first component materials are delivered into the mixing station. The loss-of-weight dispenser, which may include an augur for displacing the second component material from the sleeve at a controlled rate, may also receive a signal from the processor indicating the rate at which the augur is to rotate to dispense the desired rate of the second component material. That rate and that signal will be determined by the processor using measurements of and signals generated by the upstream weighing machine of the upstream conveyor, the time delay between first component material portions residing on the upstream weighing machine to the time they are discharged into the mixing station, and the percentage of the second component material that is desired in the blend to be produced. A high-fidelity weighing machine is provided to receive a blend of the first component material portions and second component material discharged from the mixing station, and the high-fidelity weighing machine generates a signal to the processor corresponding to the total mass amount of the blend received during a time interval of interest. The processor may receive signals from the high-fidelity weighing machine relating to the remaining capacity of the machine or indicating the need for an increase or decreased rate of blend. The processor may then generate signals to the proportional gate valve of the distribution conveyor to increase or decrease the rate at which first component material portions are fed to the upstream conveyor. In addition, the processor compares the highly accurate measurements of the total mass amount of blend received by the high-fidelity weighing machine in a time interval of interest with the measurements of the total mass of first component material portions moved across the upstream weighing machine during a corresponding time-shifted time interval of interest and the total mass of the second component material dispensed onto the first component material portions to create the blend during a corresponding time-shifted time interval of interest. Based on this comparison, the processor may calculate updated correction factors to be used to correct measurements of the mass of first component material portions residing on the upstream weighing machine and measurements of the mass of second component material dispensed in the mixing station.

An alternate embodiment of the method and system of the present invention may be used to provide a smoother, more gradually correction of the upstream mass flow rate measurement and to thereby dampen the influence of any outlier data. In an alternate embodiment, the equation may include a biasing factor of slightly less than 100% of the calculated correction factor to buffer the correction factor and to cause the correction factors to change more slowly. This alternate embodiment of the method and system present invention may be used to prevent over-correction.

It is helpful to assign abbreviations to the various parameters used in automating an embodiment of the method and system of the present invention, and these abbreviations can be used in computer program product code used to program the various automated equipment, instruments, sensors and the processor to perform the steps required to implement an embodiment of the method of the present invention. Those skilled in the art of computers and processor-controlled systems will understand that computer and processor hardware can be purchased, interconnected, wirelessly and/or via wire, and programmed to implement the steps of an embodiment of the method and system of the present invention.

For example, but not by way of limitation, the abbreviation $PM_{RAW}$ (kg) is used to represent the total mass of the first component material portions to cross the upstream weighing machine during a time interval (minute) of interest, $PM_{AVG}$ is the average mass of the first component material portions to cross the upstream weighing machine in a time interval (minute) of interest, WT (kg) is the mass of the first component material portions residing on the upstream weighing machine at a given measurement, TR is the speed (meters/sec) at which the first component material portions move on the upstream conveyor to the mixing station, K (dimensionless) is the correction factor used to correct the measurements made using the upstream weighing machine and is specific to the equipment being used and the type, nature and properties of the first component material portions being processed, and LT is the length (meters) of the conveyor section of the upstream weighing machine. The total mass of the first component material crossing the upstream weighing machine in a given minute would be calculated as:

$$PM_{RAW}=(WT \times TR \times 60 \times K)/LT$$

This determination can be made multiple times a minute and even multiple times a second due to automation to produce a series of values of $PM_{RAW}$, and we can refer to these as $PM_{RAW1}$, $PM_{RAW2}$, $PM_{RAW3}$, $PM_{RAW4}$ ... $PM_{RAWN}$, where N represents a number of successive measurements made using the upstream weighing machine.

It follows that the average mass of the first component material portions to cross the upstream weighing machine in a time interval (minute) of interest is calculated as follows:

$$PM_{AVG}=\Sigma(PM_{RAW1},PM_{RAW2},PM_{RAW3},PM_{RAW4} \ldots PM_{RAWN})/N.$$

The amount of second component material portions to be applied to the stream of first component material portions at any given time is therefore calculated based on a desired percentage of the blend to be comprised of the second component material portions, and it is calculated using a correction factor, FT, that is specific to the equipment being used and to the type, nature and properties of the second component material and possibly to the conditions in the facility. If that desired percentage is represented as S (%), then the mass of the second component material to be applied to the stream of first component material portions is calculated as:

$$SEA=PM_{AVG} \times S \times FT/(6.0 \times (1-(S/100))$$

It will be understood that the correction factors, K and FT, used to correct the measurements of the total mass of the first component material portions and the second component material dispensed thereon, respectfully, are initially retrieved from a historical database in which previously calculated correction factors are stored. Those correction factors may be retrieved from a historical database and used at start-up of an embodiment of the method and system of the present invention, and the initial or default correction factors may be referred to as $K_0$ and $FT_0$. Subsequent determinations of the correction factors will be generated and used, and they will also be stored in the historical database for start-up of the process at a later time using the same equipment and the same ingredient materials for the blend.

Embodiments of the method and system of the present invention begin with a measurement made using the high-fidelity weighing machine that receives the blend as it is discharged from the mixing station. An abbreviation for that value is $CCW_{TOT}$, which is the total mass of the blend received and weighed by the high-fidelity weighing machine in a time interval of interest.

As stated above, the automation of embodiments of the method and system of the present invention enables many measurements to be taken, and a large number of successive and frequent measurements, used in an averaging process and a prescribed number of valid sample sets, suppresses the otherwise disruptive effect of an anomaly in the data. For example, It is important to determine the time-shifts between the upstream weighing machine, the loss-of-weight dispenser in the mixing station and the high-fidelity weighing machine, and to thereafter use time shifting to compare measurements taken by the high-fidelity weighing machine to measurements by the loss-of-weight dispenser that dispenses the second component material and measurements by the upstream weighing machine. This is because the time delay after the first component material portions are weighed and that measurement is used to apply the second component material must be coordinated in order for the mass applications to correlate. Likewise, it is important to account for the time delay after the first component material portions are weighed, and the time delay after the second component material is applied to be coordinated with the time delay before the blended material discharges from the high-fidelity weighing machine. If the rate, or time delay, at which first component material portions move through the mixing station varies, then the rate at which the second component material is dispensed must take into account these variations, and the amount of time required for the first component material portions that were on the upstream weighing machine at the time of a measurement to then travel to the mixing station must be taken into account. Similarly, the time required for blend created in the mixing station to travel to the high-fidelity weighing machine must also be taken into account using the time shifting approach. This time shift strategy is increasingly more critical to accurate calculations with greater moment-to-moment fluctuation of the incoming raw product stream rate. This time shifting strategy can be illustrated in FIGS. 9-11.

FIGS. 9-11 show three graphs arranged along a common time axis along the horizontal bottom of the image. The top graph represents the total mass of the first component material portions moving across the upstream weighing machine as time progresses from $T_0$ to $T_7$. The middle graph represents the total mass of the second component material being dispensed in the mixing station as the time progresses from $T_0$ to $T_7$. The bottom graph represents the total mass of the blend of the first component material portions and the second component material being discharged to the high-fidelity weighing machine.

$T_0$ is the moment that the proportional gate on the distribution conveyor receives a call-for-product signal and opens to release first component material portions to the upstream conveyor. $T_1$ is the moment that the leading first component material portions arrive at the upstream weighing machine. $T_2$ is the moment that the second component material, based upon the first component material rate, is introduced into the product stream. $T_3$ is the moment that the blended first component material portions mixed with the second component material portions are discharged from the high-fidelity weighing machine. $T_7$ marks the high-fidelity weighing machine becoming satisfied and stopping the material stream and it is the moment of the first use of an embodiment of the method and system of the present invention to determine a correction factor, K, for correcting measurements of the upstream weighing machine and a correction factor, FT, for correcting measurements of the loss-of-weigh dispenser. It will be understood that during the time interval from $T_0$ to $T_1$ there are no first component material portions either on the upstream weigher or in the mixing station, and there is no blend available to be discharged to the high-fidelity weighing machine. It follows that during this interval, no second component material is being dispensed in the mixing station and no measurements are being made by either of the upstream weighing machine or the loss-of-weight dispenser. During the time interval from $T_1$ to $T_2$, there are first component material portions on the upstream weighing machine and measurements are being made, but there are no first component material portions in the mixing station to be blended with second component material, and there is no blend available to be discharged to the high-fidelity weighing machine. During the time interval from $T_3$ to $T_7$, there are first component material portions on the upstream weighing machine and measurements are being made, there are first component material portions in the mixing station to be blended with second component material and second component material is being dispensed on those first component material portions to create a blend, and there is blend being discharged to the high-fidelity weighing machine to be weighed. The rate at which second component material is dispensed in the mixing station at time $T_3$ is not a function of the measurements being made by the upstream weighing machine at time $T_3$ because that would fail to take into account the time required for first component material portions weighed on the upstream weighing machine to move to the mixing station. Instead, the rate at which second component material is dispensed in the mixing station at time $T_2$ is a function of the measurements being made by the upstream weighing machine at time $T_1$ because the difference between $T_2$ and $T_1$ is the time shift between the loss-of-weight dispenser and the upstream weighing machine. Similarly, the total mass of blend weighed during the interval from $T_1$ to $T_7$ using the high-fidelity weighing machine cannot be compared to the total mass of first component material portions weighed by the upstream weighing machine during the interval from $T_1$ to $T_7$ or to the total mass of second component material portions dispensed by the loss-of-weight dispenser during the interval from $T_1$ to $T_7$ because that would fail to take into account the time required for first component material portions weighed on the upstream weighing machine to move to the mixing station and the time required for mixing the first component material portions with the second component material in the mixing station, and the time required for the blend created in the mixing station to be discharged from the mixing station to the high-fidelity weighing machine. $T_4$ represents $T_6$ minus the difference between $T_3$ and $T_1$, that difference being the time shift between the high-fidelity weighing machine and the upstream weighing machine. $T_5$ represents $T_6$ minus the difference between $T_3$ and $T_2$, that difference being the time shift between the high-fidelity weighing machine and the loss-of-weight dispenser. Upon comparison of the highly reliable measurements of the total mass of blend discharged to the high-fidelity weighing machine to the measurements of the upstream weighing machine and the loss-of-weight dispenser, we must discard all measurements taken by the upstream weighing machine after time $T_4$ and we must discard all measurements taken by the loss-of-weight dispenser after time $T_5$. These discarded portions of the measurement data are shown graphically in the above image. Discarding this superfluous data enables the comparison of the appropriate measurements to enable the determination of correction factors that can be used to correct measurements by the upstream weighing machine and the loss-of-weight dispenser.

Even though, for simplicity, the flow rates are shown graphically as straight lines representing exact, unchanging rates, the time shifting function accounts for any variation in the moment-to-moment mass flow rate of the first component material. The second component application rate would reflect the variation of the first component mass flow rate, as would the output of the high-fidelity weighing machine.

The discussion above refers generically to first component material portions, to second component material to be added to and mixed with the first component material portions in the mixing station, to a mixing station to thoroughly mix the first component material portions and the second component material, and to a high-fidelity weighing machine to weigh the blend produced. The embodiment of the system and method of the present invention can be explained in greater detail below by reference to drawings illustrating an application of an embodiment of the present invention to produce a common consumer good such as potato chips. Although embodiments of the present invention can be used to produce a precise blend of many combinations of materials, potato chips is a good example because the wide variety of different shapes, size, textures and density of the chips (first component material portions) that are cooked and delivered using a distribution conveyor to the upstream conveyor, and the wide variety of different types of flavoring agents (salt, spices, etc.)(second component material portions) that are used to flavor the cooked chips present presents an exemplary application of the benefit that can be achieved by use of an embodiment of the present invention. It will be understood that, although "food portions" is used in place of "first component material portions" in the detailed description the equipment below, and although "flavoring agents" is used in place of "second component material" in the detailed description below, these phrases are used to explain an actual application of an embodiment of the present invention and should be not understood as limiting of the invention, which is limited only by the claims.

DETAILED DESCRIPTION

Figure 1:
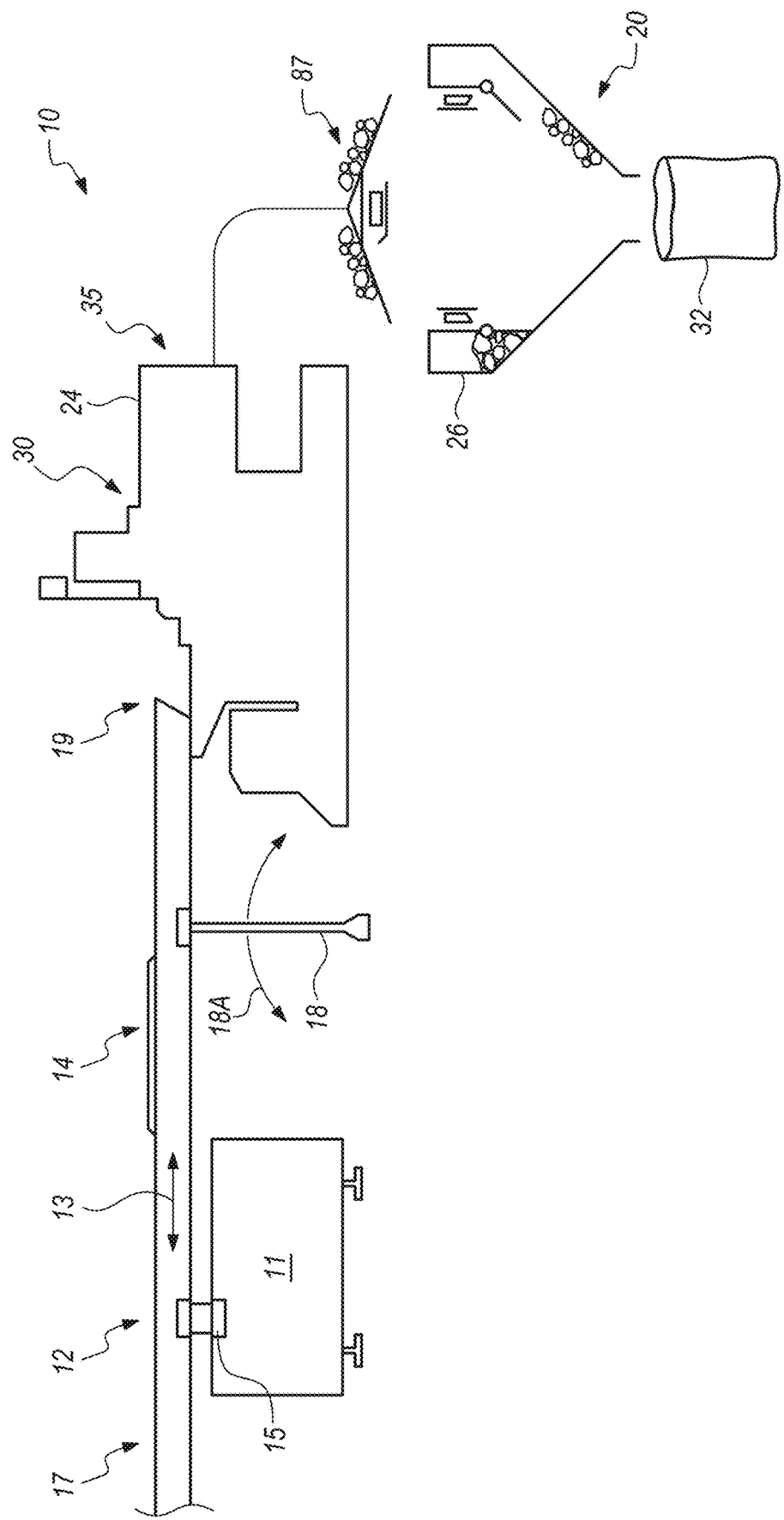
FIG. 1 is an elevation view of a conveyor system having an upstream conveyor with an upstream weighing machine, a flavoring station in which raw food portions (first component material portions) and flavoring agents (second component material) are combined and mixed, and a downstream weighing and bagging machine, the system for moving a stream of raw food portions from an upstream process (not shown) to a mixing station for dispensing one or more flavoring agents onto the stream of food portions, and for then discharging that stream of flavored food portions (blend) from the mixing station to a weighing and bagging machine that weighs and bags a predetermined mass amount of the flavored food portions (blend) in each bag.

One embodiment of the method and system of the present invention provides for improving the accuracy of measurements of the mass flow rate at which a first component material (hereinafter referred to as raw food portions in the example of the embodiment of the method and system of the present invention described below) are conveyed on an upstream conveyor that delivers the stream of raw food portions to a mixing station in which one or more second component materials (hereinafter referred to as flavoring agents in the example of the embodiment of the method and system of the present invention described below) are dispensed onto and mixed the raw food portions to form a blend (hereinafter referred to as flavored food portions in the example of the embodiment of the method and system of the present invention described below), and further including a high-fidelity weighing (and bagging) machine that deposits a predetermined mass amount of flavored food portions in each bag. The bags are then sealed and shipped for sale to consumers. One embodiment of the method and system of the present invention provides for accurately controlling the percentage mass flow rate at which the one or more flavoring agents are dispensed onto the stream of raw food portions being conveyed on the upstream conveyor to the flavoring station to ensure uniformity and consistency of the flavored food portions discharged from the mixing station to the high-fidelity weighing machine.

In many product flow measurement systems variables are introduced which can dramatically impact the measuring accuracy unless periodic corrections and/or adjustments to the measurement process are properly implemented. Also, because those variables can change over time, corrections and/or adjustments must be made on a continuous or frequent basis. An example of the need for correction or adjustment in the context of measurement of the volume of a raw food portions can be found in the measurement of the mass flow rate of a stream of raw food portions moving on a conveyor through to a mixing station, also referred to as an on-machine flavoring process. For example, corrections and adjustments in the mass flow rate at which raw food portions move on a conveyor system may be required to compensate for variations in product fill, product density and product travel rate that occur in real time and will, unless adjusted for, diminish the accuracy of the mass flow rate measurement. For example, a build-up of residue on a portion of the conveyor upstream of a mixing station can impact the accuracy of the measurement of the mass flow rate at which raw food portions are delivered to the mixing station unless corrections and adjustments are made to compensate for the change in the speed at which the raw food portions are conveyed along the portion of a conveyor upstream of the mixing station. It will be understood that this is just an example of one variable that can impact the accuracy of mass rate measurements, and that other factors also impact or affect the mass flow rate measurements.

A conveyor, such as a vibratory conveyor or a differential impulse conveyor, can be used to convey a stream of raw food products from an upstream process (e.g., a raw food portions cooking or forming process) in a food processing facility to a mixing station. Vibratory conveyors and differential impulse motion conveyors are favorable for processing of raw food portions because they can include elongated stainless steel trays with few or no seams to collect crumbs or debris. These types of conveyors result in less damage to and breakage of the raw food portions as they are moved along the conveyor sections and are easy to clean. A volumetric flow rate measurement system or a mass flow rate measurement system can be used to measure the rate at which either a volume or a mass of food portions moves along the upstream conveyor, respectively, at a given time. A volumetric mass flow rate measurement system measures a volumetric rate at which raw food portions move past a given point on the upstream conveyor using an assumed or empirically determined raw food portion density, a speed of movement and a measured volume of raw food portions per unit (foot or meter) of linear measurement of the conveyor section. For example, but not by way of limitation, an ultrasonic sensor disposed above a portion of an upstream conveyor that is disposed upstream of a mixing station may be used to detect the height interface (or average height interface) of a stream of raw food products moving within the upstream conveyor, and that height interface (or average height interface) may be multiplied by the width of the conveyor and by the speed (assumed or empirically determined) at which the raw food portions move within the upstream conveyor to obtain a volume of raw food portions (in cubic feet or cubic meters) moving past a given point along the upstream conveyor each second or minute of time. Finally, that volumetric flow rate can be multiplied by an assumed or empirically determined density of the raw food portions (pounds per cubic foot or kilograms per cubic meter) to obtain an accurate estimate of the mass flow rate at which the raw food portions pass a given point during each unit of time (in pounds or kilograms per second or per minute). It will be understood that raw food portions are generally uniform in shape and structure, and that an empirical determination of the density of stacked or piled raw food portions can be reliably obtained.

An alternate mass flow rate measurement determination involves fewer steps. A section of the conveyor system, also called a conveyor section, that is upstream of the mixing station can be disposed on or supported by one or more load cells to provide a scale for obtaining a measurement of the amount of mass of the conveyor section and the raw food products residing thereon at a given moment. The load cell(s) generate a signal to a processor corresponding to the detected load. The known mass of the conveyor section can be subtracted from that measured mass to determine the mass of the raw food portions residing on the conveyor section at the given moment. Multiplying that result by the rate at which the raw food portions move within the upstream conveyor provides the mass flow rate at which the raw food portions move within the upstream conveyor past a given point on the upstream conveyor (such as a discharge end or terminus) during a given interval of time, which is the mass flow rate at which the raw food portions are being delivered into the mixing station for the addition of one or more flavoring agents. This accurate determination of the mass flow rate at which raw food portions are delivered to the mixing station enables more precise dispensation of flavoring agents onto the raw food portions for a more uniform and consistent quality of the flavored food portions produced, packaged and shipped for sale to consumers.

One embodiment of the method and system of the present invention provides for correcting measurements of the mass flow rate at which a stream of raw food portions moves along a upstream conveyor to provide a more accurate determination of the actual mass flow rate at which raw food portions are delivered to a mixing station for the addition of a percentage mass rate (that is, a percentage of the mass flow rate at which the raw food portions are delivered) amount of the one or more flavoring agents dispensed onto the raw food portions. Corrected measurements enable the proper amount of the one or more flavoring agents to be added to the raw food portions for consistently and uniformly flavored food portions to then be fed to a high-fidelity weighing machine. Accurate measurements are best obtained by correcting data obtained using continuous runs of a sufficient duration. For example, a continuous run of 30 or more seconds may provide enough time to allow the upstream weighing machine (the conveyor section and the load cells) and a speed sensor (or observation of speed of conveyance) to be together used to obtain an upstream mass flow rate measurement, for flavoring agents to be dispensed onto the food portions that resided on the upstream weighing machine at the time of the upstream mass rate measurement, and then for the flavored food portions that resided on the upstream weighing machine at the time of the upstream mass rate measurement to be discharged from the flavoring station to the high-fidelity weighing machine. In a preferred embodiment of the method and system of the present invention, data is taken from the upstream weighing machine and then from the high-fidelity weighing machine at or within a predetermined time delay after obtaining the upstream mass flow rate measurement. Stated another way, the speed at which stream of food portions moves on the upstream conveyor, as measured using speed sensors or by way of observation, are used to determine a time delay so that the measurement of a downstream mass flow rate obtained using the high-fidelity weighing machine can, if possible, be taken when those food portions that resided on the upstream weighing machine at the time of the upstream mass flow rate measurement reside in or on the high-fidelity weighing machine. This method minimizes the impact of variations in the mass flow rate at which raw food portions are conveyed along the upstream conveyor to the mixing station.

In one embodiment of the method and system of the present invention, mass flow rate measurement data collection is continued until the continuous operation is halted after, for example, 3 to 4 minutes. The two mass flow rate measurement data sets, one using for the upstream weighing machine and the other using the high-fidelity weighing machine, are compared one with the other, and the correction factor is determined, and the correction factor is then used to correct subsequent upstream total mass or mass flow rate measurements to harmonize them with the more accurate downstream total mass or mass flow rate measurements. The correction factor compensates, for example, for travel rate variations, in both the weight based and volumetric-based method embodiments, and also adjusts for inaccuracies occurring due to the raw food portion piling and/or density changes where the volumetric-based embodiment is used, or for the impact of accumulated flavoring agents residue on equipment surfaces. As continued operation of the conveyor system resumes, the process above repeats itself and the correction factor is again updated to further narrow the gap between the upstream total mass or mass flow rate measurement and the corresponding time delayed downstream total mass or mass flow rate measurement. Each time, the two total mass or mass flow rate measurements get closer one to the other as the upstream measurement becomes more and more accurate.

Once the correction factor for harmonizing the upstream total mass or mass flow rate measurements and the assumed percentage total mass or mass flow rate of flavoring agents dispensed thereon with the downstream total mass or mass rate measurements, embodiments of the method of the present invention can be used to correct the assumed percentage total mass or mass flow rate at which the one or more flavoring agents are being added as described above. Flavoring agents may be adjustably dispensed using a variety of adjustable dispensation devices including, for example, but not limited to, augurs for dispensing flavoring agents in the form of dry or powdered seasonings and/or salt, and/or sprayers for dispensing flavoring agents in the form of liquids, such as oils. A tumble drum or other device may be provided within the system within the flavoring station for agitating or mixing the stream of raw food portions with the one or more flavoring agents dispensed thereon.

FIG. 1 is an elevation view of a conveyor system 10 with which an embodiment of the method of the present invention can be employed. The conveyor system of FIG. 1 includes an upstream conveyor 12 and a high-fidelity weighing machine 20, and also a mixing station 30 disposed therebetween. The upstream conveyor 12 of FIG. 1 includes an upstream weighing machine 14 for weighing a plurality of raw food portions (not shown in FIG. 1) as they move from the left to the right on the upstream conveyor 12 of FIG. 1 to the mixing station 30. The upstream conveyor 12 of FIG. 1 further includes a receiving end 17, a discharge end 19, and a driver 11 connected to the upstream conveyor 12 through a bracket 15 to reciprocate the upstream conveyor 12 as indicated by the double-headed arrow 13. The upstream conveyor 12 of FIG. 1 further includes a pivoting support leg 18 that pivots as indicated by double-headed arrow 18A as the upstream conveyor 12 reciprocates. Raw food portions moved on the upstream conveyor 12 are discharged from the discharge end 19 of the upstream conveyor 12 to the mixing station 30 disposed adjacent to the discharge end 19 of the upstream conveyor 12.

Flavoring agents (not shown) such as, for example, but not by way of limitation, powdered agents, oil and salt, may be dispensed onto and mixed with the raw food portions discharged from the discharge end 19 of the upstream conveyor 12 into the mixing station 30. The mixing station 30 of FIG. 1 includes a tumble drum 24 that rotates about a generally horizontal axis to agitate and mix the raw food portions and the flavoring agents applied thereon before the flavored food portions are discharged from an outlet 35 of the tumble drum 24 to the high-fidelity weighing machine 20.

The high-fidelity weighing machine 20 of FIG. 1 receives a stream of flavored food portions (not shown in FIG. 1) discharged from the mixing station 30 to the high-fidelity weighing machine 20 of FIG. 1. It will be understood that while the illustration of the high-fidelity weighing machine 20 of FIG. 1 shows only a single bag 32 positioned to receive flavored food portions 88 from either of two bins 26 of the high-fidelity weighing machine 20, an actual high-fidelity weighing machine 20 may have many bins 26 that can be emptied to many bags 32 positioned therebelow, and that a single bag 32 is shown merely for illustration. It will be further understood that while FIG. 1 shows only a single high-fidelity weighing machine 20, a conveyor system 10 of the present invention may include more than one high-fidelity weighing machine 20.

Figure 2:
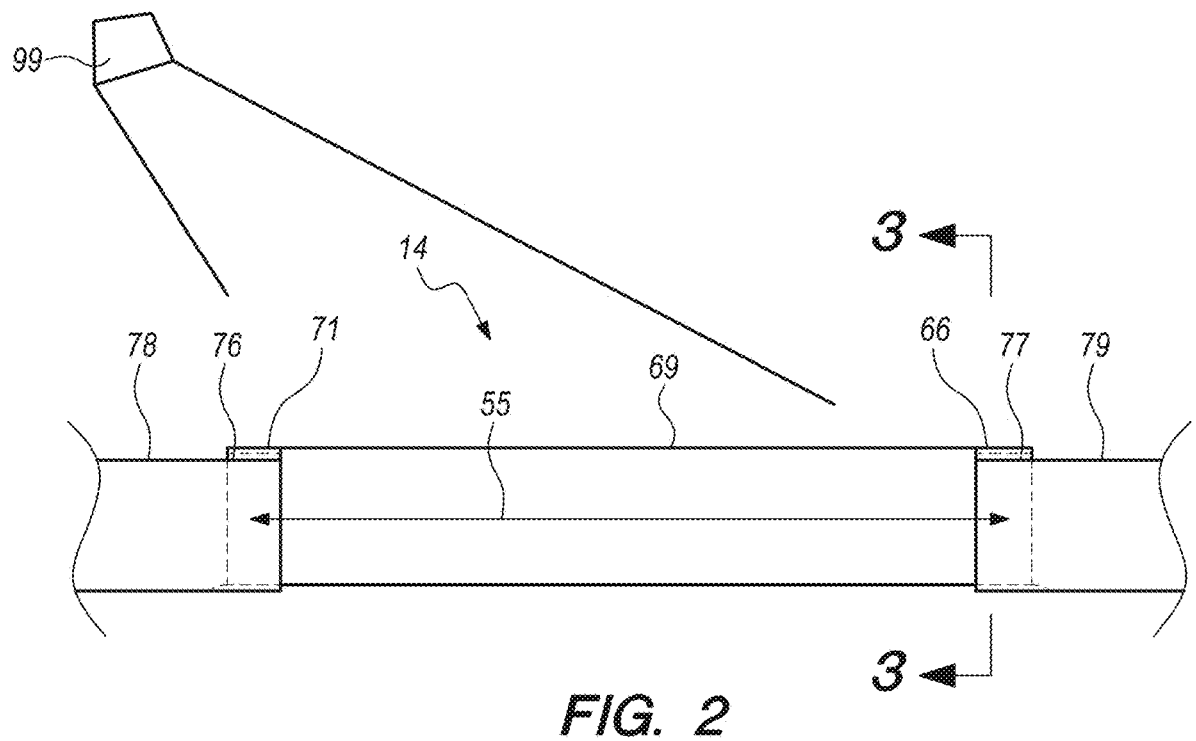
FIG. 2 is an enlarged elevation view of an upstream weighing machine of the upstream conveyor of the system of FIG. 1 having load cells to enable measurement of the load imparted by raw food portions (not shown) residing on a conveyor section of the upstream weighing machine as raw food portions are conveyed on the upstream conveyor from an upstream process (not shown) to the mixing station for the addition of flavoring.

FIG. 2 is an enlarged elevation view of the upstream weighing machine 14 which includes a conveyor section 69 equipped with a upstream load cell pair 76 at a first end 71 of the conveyor section 69 and a downstream load cell pair 77 at a second end 66 of the conveyor section 69 to enable measurement of the rate at which a raw food portions 87 are conveyed by the upstream conveyor 12 to the mixing station 30 (see FIG. 1). The conveyor section 69 illustrated in FIG. 2 may have a known weight and length 55. The conveyor section 69 of FIG. 2 is supported at a first end 71 by a first adjacent upstream conveyor portion 78 and at a second end 66 by a second adjacent upstream conveyor section 79. The upstream load cell pair 76 and the downstream load cell pair 77 each sense the load imparted to the upstream load cell pair 76 and downstream load cell pair 77 and generate corresponding signals to a processor 100 (not shown in FIG. 2—see FIG. 8) indicating the load sensed by each load cell pair 76 and 77. These signals can be used to determine the weight of the portion of the stream of food portions 87 (not shown—see FIG. 3) supported within the conveyor section 69 at a given moment in time.

Figure 3:
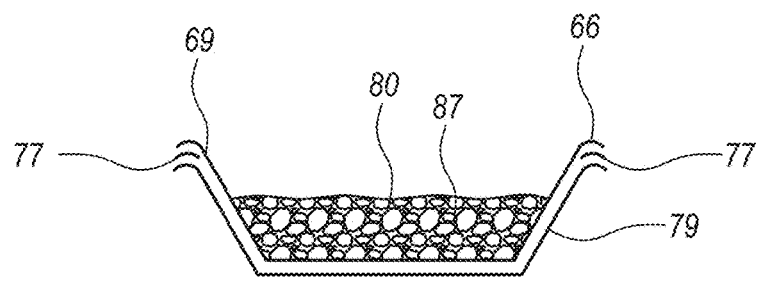
FIG. 3 is a sectional view of the upstream weighing machine of FIG. 2 illustrating the profile of the conveyor section of the upstream weighing machine and raw food portions being conveyed to the mixing station within the upstream conveyor.

FIG. 3 is a sectional view of the enlarged conveyor section 69 of FIG. 2 at the second end 66 where the conveyor section 69 is supported by the second adjacent upstream conveyor section 79. The second load cell pair 77 are shown as captured intermediate the conveyor section 69 and the supporting second adjacent upstream conveyor section 79. FIG. 3 illustrates a stream of raw food portions 87 supported in a stacked or piled configuration within the conveyor section 69. The weight of the stream of raw food portions 87 within the conveyor section 69 can be detected using the first load cell pair 76 and a second load cell pair 77, each of which generate signals to a processor 100 corresponding to the sensed load. The speed at which the stream of raw food portions 87 moves through the conveyor section 69 is either detectable using speed sensors that generate signals to the processor 100 corresponding to the detected speed or is visually observable by operations personnel, and the load cell signals, along with the length of the conveyor section 69, the weight of the conveyor section 69 and the speed at which the stream of raw food portions move on the conveyor section 69, enable the determination in the processor 100 of the total mass or the mass flow rate at which the raw food portions 87 are delivered to the mixing station 30 (not shown in FIG. 3).

In some embodiments of the method and system of the present invention, the speed at which the stream of raw food portions 87 move within the upstream conveyor 12 may be detected using a speed sensor 99. FIG. 2 illustrates a speed sensor 99 disposed above the upstream conveyor 12 to detect the speed with which raw food portions 87 (not shown in FIG. 2) move within the upstream conveyor 12 towards the mixing station 30 (not shown). Speed sensors 99 may, in some embodiments, include the use of laser light. For example, one embodiment of the method and system of the present invention may include the use of a speed sensor 99 that determines the speed of movement of the stream of raw food portions 87 by sending out two laser pulses (not shown) and that calculates the difference in time it takes to detect the pulses of light reflected from a target which may be, for example, a single raw food portion. In other embodiments, the speed sensor 99 may be an optical speed sensor that locks onto a single food portion and detects the time interval required for the raw food portion to move from a first stripe or marker to a second stripe or marker spaced apart from the first stripe or marker on the upstream conveyor 12. In another embodiment of the method and system of the present invention, operating personnel visually determine the speed by monitoring the upstream conveyor 12 to measure a time interval required for a single raw food portion within the upstream conveyor 12 to move from a first stripe or marker to a second stripe or marker.

In still other embodiments of the method and system of the present invention, the upstream conveyor 12 is equipped with instruments and/or sensors that enable the determination of the volumetric flow rate at which a stream of raw food portions 87 are delivered to the mixing station 30 on the upstream conveyor 12. Implementation of one of these embodiments may include the determination of the cross-sectional profile of the stacked or piled raw food portions 87 moving within the conveyor section 69 so that a cross-sectional flow area of the stream of raw food portions 87 can be determined by sensing the height interface 80 (see FIG. 3) of the stream of raw food portions 87 within the upstream conveyor 12, correlating the detected height interface 80 to a cross-sectional flow area of the raw food portions 87 moving within the upstream conveyor 12, and then by sensing the speed at which the stream of raw food portions 87 move within the upstream conveyor 12 towards the mixing station 30. Multiplying the cross-sectional flow area (in square feet or square meters) of the stream of raw food portions 87 times the speed at which the stream of raw food portions 87 moves within the upstream conveyor 12 (in feet per second or meters per second) provides the volumetric flow rate of movement of the stream of raw food portions 87 (for example, in cubic feet per second or cubic meters per second). This volumetric flow rate can be multiplied by an empirically determined density of the raw food portions 87 (in pounds per cubic foot or in kg per cubic meter) to obtain a mass flow rate of raw food portions 87 within the upstream conveyor 12.

Figure 4A:
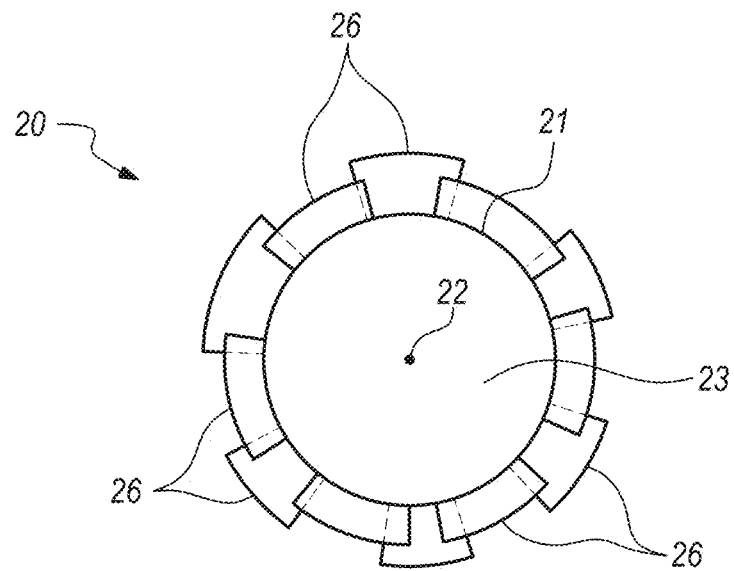
FIG. 4A is an illustrated plan view of a weighing and bagging machine that can be used to accurately measure a mass flow rate at which flavored food portions are discharged from the mixing station of the system of FIG. 1 to the weighing and bagging machine.

FIG. 4A is a plan view of a high-fidelity weighing machine 20 of FIG. 1 that can be used to accurately measure a total mass or mass flow rate at which flavored food portions 88 (not shown in FIG. 4A) are discharged from a mixing station 30 (see FIG. 1) to the high-fidelity weighing machine 20. The high-fidelity weighing machine 20 of FIG. 4A includes a dispersion surface 21 including a central high point 22 from which the dispersion surface 21 slopes downwardly. The dispersion surface 21 may be domed (dispersion dome) or conical in shape (dispersion cone). The high-fidelity weighing machine 20 further includes a plurality of circumferentially distributed bins 26 disposed about and below the dispersion surface 21 to catch and retain individual flavored food portions 88 (not shown in FIG. 4A) that slide off of and fall from the dispersion surface 21. The plurality of bins 26 illustrated in FIG. 4A are circumferentially overlapping to promote the catching of most or all of the flavored food portions 88.

Figure 4B:
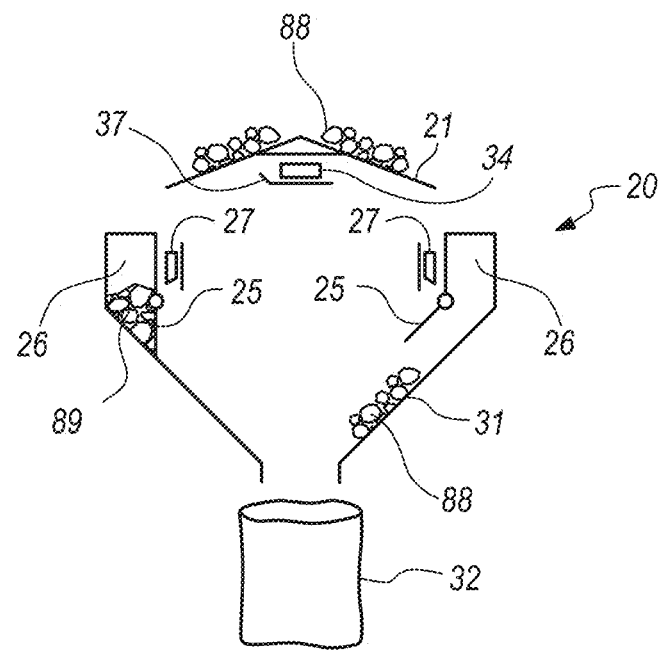
FIG. 4B is a sectional view of the weighing and bagging machine of FIG. 4A illustrating the manner in which flavored food portions of a known mass are accumulated within and then discharged from each of the bins of the weighing and bagging machine into bags positioned to receive and hold the flavored food portions. Each bag receives a predetermined mass amount of the flavored food portions and is then sealed and shipped for sale to consumers.

FIG. 4B is a sectional elevation view of a portion of the high-fidelity weighing machine 20 of FIG. 4A illustrating the manner in which accumulated flavored food portions 88 of known mass are accumulated within and then discharged from each of the bins 26 into a bag 32 positioned therebelow. FIG. 4B illustrates the dispersion surface 21 onto which an amount of flavored food portions 88 are discharged. The flavored food portions 88 slide down and then descend from the dispersion surface 21 to fall into the bins 26. Each bin 26 is coupled to a load cell 27 that generates a signal to a processor 100 (not shown) corresponding to the weight of the bin 26 and the mass of the flavored food portions 88 received within each bin 26. Each bin 26 is equipped with a dumping door 25 movable between an open position (illustrated on the right side of FIG. 4B) to drop or release flavored food portions 88 to the bag 32 and a closed position (illustrated on the left side of FIG. 4B) to accumulate and/or hold flavored food portions 88. The doors 25 can be opened and closed by activation of an actuator 33 (not shown in FIG. 4B—see FIGS. 4C and 4D). Upon activation of the actuator 33, a closed door 25 can be moved from the closed position, shown on the left of FIG. 4B, to an open position shown by the door 25 on the right of FIG. 4B. When the load cell 27 indicates a selected weight of the flavored food portions 88 in the bin 26, the door 25 moves to the open position, the accumulated flavored food portions 88 within the bin 26 as shown on the left of FIG. 4B drops from the bin 26 into a chute 31 as shown by the flavored food portions 88 on the right of FIG. 4B. The flavored food portions 88 continue to descend into the bag 32 positioned underneath the chute 31 to receive the flavored food portions 88. An additional load cell 34 may be provided to sense the load imparted to the dispersion surface 21 by the stream of flavored food portions 88 discharged from the flavoring station 30 to the high-fidelity weighing machine 20.

Figure 4C:
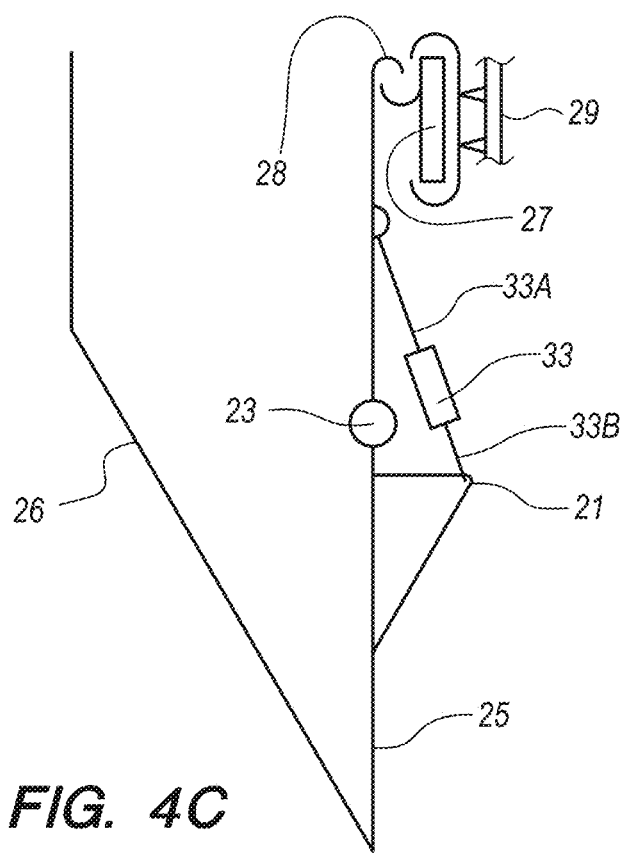
FIG. 4C is an enlarged view of a bin of the weighing and bagging machine having a bracket coupled to a support the bin and a load cell disposed intermediate the bracket and a support.

FIG. 4C is an enlarged view of a bin 26 of the high-fidelity weighing machine 20 of FIG. 4A having a bracket 28 coupled to a support 29 and a load cell 27 disposed intermediate the bracket 28 and the support 29. The load cell 27 generates a signal to a processor 100 (not shown in FIG. 4C—see FIG. 8). The door 25 is coupled to the bin 26 using a hinge 23. The actuator 33 is coupled intermediate the door 25 and the bin 26 to pivot the door 25 between a closed position, illustrated in FIG. 4C, and an open position illustrated in FIG. 4D. A link 33B is coupled intermediate the actuator 33 and the bin 26 and a piston rod 33A is illustrated as extending from the actuator 33 and pivotally coupled to the door 25. The actuator 33 shown in FIG. 4C is in the extended configuration to retain the door 25 in the closed position.

Figure 4D:
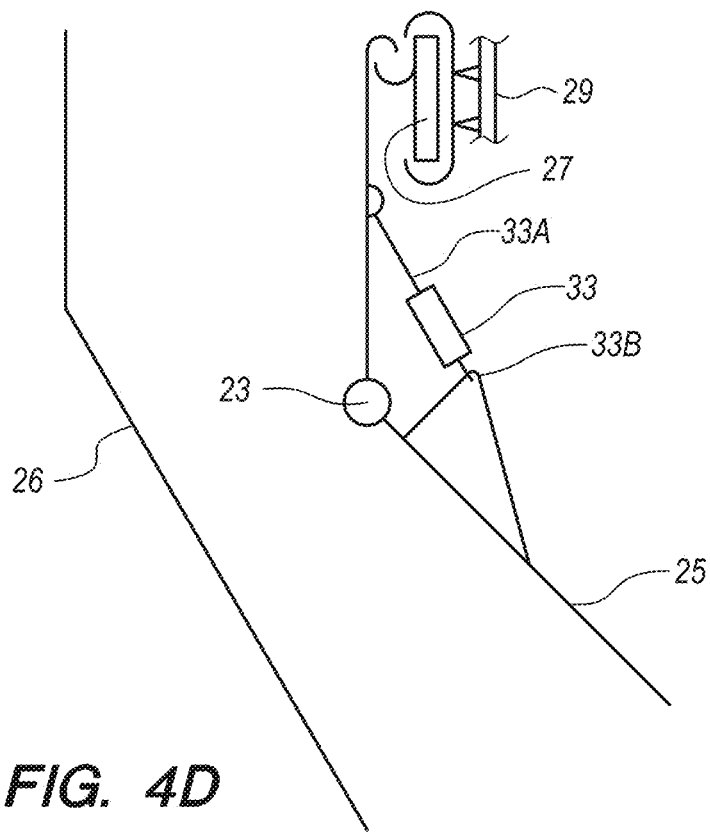
FIG. 4D is the enlarged view of the bin of FIG. 4C after actuation of an actuator to stroke a piston rod and to thereby withdraw the piston rod into the actuator to thereby pivot a door about a hinge to the open position to dump the predetermined mass of food portions accumulated in the bin.

FIG. 4D is the enlarged view of the bin 26 of FIG. 4C after actuation of the actuator 33 to stroke the piston rod 33A and to thereby withdraw the piston rod 33A into the actuator 33 to pivot the door 25 about the hinge 23 to the open position. It will be understood that any contents within the bin 26 will be dropped from the bin 26 into the bag 32 (not shown) as illustrated in FIG. 4D.

An alternative to using an upstream weighing machine 14 within the upstream conveyor 12 to determine the mass flow rate of raw food portions 87 being delivered to the mixing station 30 shown in FIG. 1 is to determine the total mass or mass flow rate by first determining a volumetric flow rate at which the stream of raw food portions 87 are delivered to the mixing station 30 by the upstream conveyor 12 and then be converting that volumetric flow rate into a total mass or mass flow rate by multiplying the volumetric flow rate by an empirically determined density of the stream of food portions 87 and, for the total mass, multiplied by the time interval of interest. Two such approaches can be explained by reference to FIGS. 5 and 6.

Figure 5:
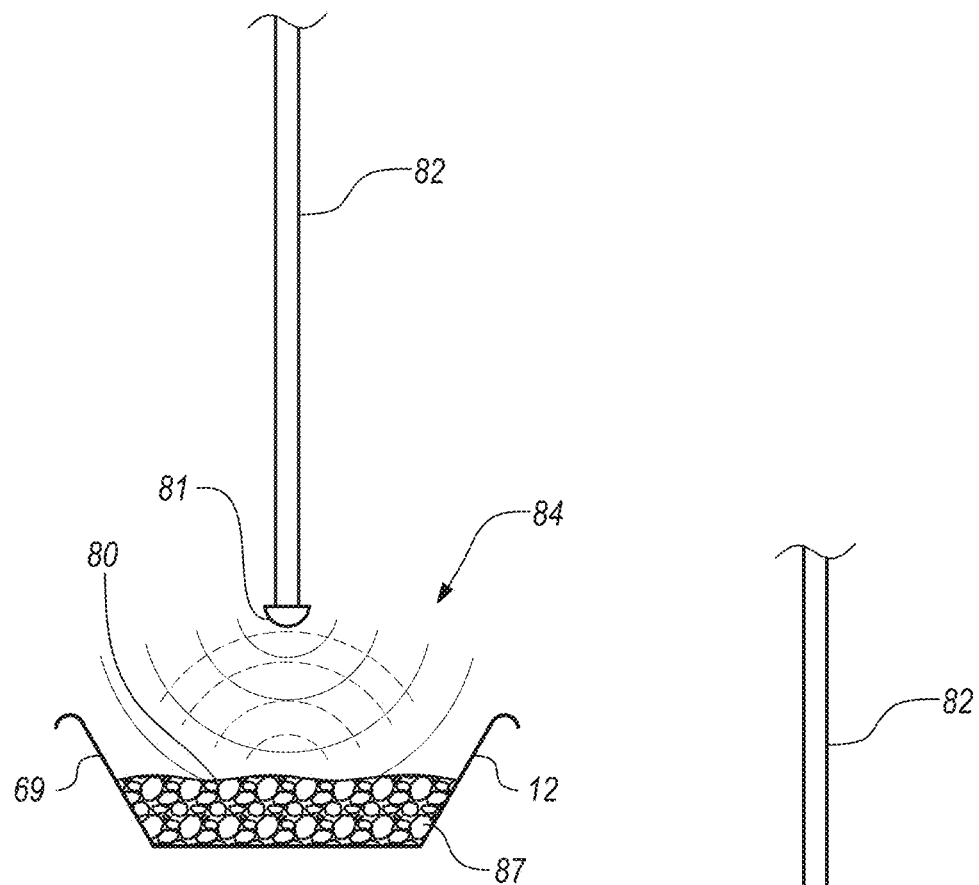
FIG. 5 is an elevation view of an ultrasonic interface sensor that can be used in an alternate embodiment of the method and system of the present invention, the ultrasonic interface sensor for detecting the interface height of the stream of raw food portions in the upstream conveyor.

FIG. 5 is an elevation view of an ultrasonic interface height sensor 81 for detecting the interface height 80 of the stream of raw food portions 87 in the upstream conveyor 12. As shown in FIG. 5, an interface height 80 of the stream of raw food portions 87 in the upstream conveyor 12 is detectable using an ultrasonic or optical interface height sensor 81 supported using a support 82 above the upstream conveyor 12. An ultrasonic sensor 81 emits an ultrasonic wave 84 that reflects off of the interface height 80 of the stream of raw food portions 87 therebelow, and the reflected wave 84 is received back at the sensor 81. Given that the position of the sensor 81 relative to the upstream conveyor 12 is known and observable, the amount of time required for the emitted ultrasonic signal to reflect and be received at the sensor 81 can be used to determine the interface height 80 of the stream of raw food portions 87. The determined interface height 80 of the stream of raw food portions 87 enables the determination of a cross-sectional flow area of the raw food portions 87 in the upstream conveyor 12 because the configuration and dimensions (i.e., profile) of the upstream conveyor 12 are known, and a specific cross-sectional area corresponds to each interface height 80. For example, a lookup table can be prepared for enabling the quick determination of the area of the cross-section of the stream of raw food portions 87 based on the detected interface height 80. The cross-sectional view of the upstream conveyor 12 shown in FIG. 5 shows an inverted trapezoidally-shaped cross-section of the stream of raw food portions 87 with the floor of the upstream conveyor 12 representing a short side (bottom) and the interface height 80 representing the parallel long side (top) of the trapezoid. This means that the cross-sectional flow area can be easily determined by the formula (a+b)×½×h, where a is the length of the short side (bottom), b is the length of the parallel long side (top), and h is the interface height 80 therebetween. Since the shape of the upstream conveyor 12 is fixed, the width of the bottom is known, the width of the top can be correlated to the interface height 80 because the sides are fixed, and the interface height 80 can be detected using the ultrasonic sensor 81. A processor 100 may simply receive a signal from the interface height sensor 81 corresponding to the interface height 80 detected by the ultrasonic sensor 81 shown in FIG. 5, and the processor 100 may access a look-up table to retrieve a cross-sectional flow area of the stream of raw food portions 87 corresponding to the detected interface height 80. The propensity of the raw food portions to pile, rather than to lie flat, depends on the shape and size of the individual raw food portions 87, as well as the texture, the weight of each raw food portion and the extent to which vibrations from the upstream conveyor 12 causes settling. Some raw food portions, such as potato chips, may pile more than other raw food portions having a greater density or smoother exterior. A factor can be applied to condition the signal from the ultrasonic interface height sensor 81 to compensate for the increased cross-sectional flow area that may be present with raw food portions that pile. Generally, the reciprocating motion of the upstream conveyor 12 will cause the raw food portions to level out or it will at least minimize piling.

Figure 6:
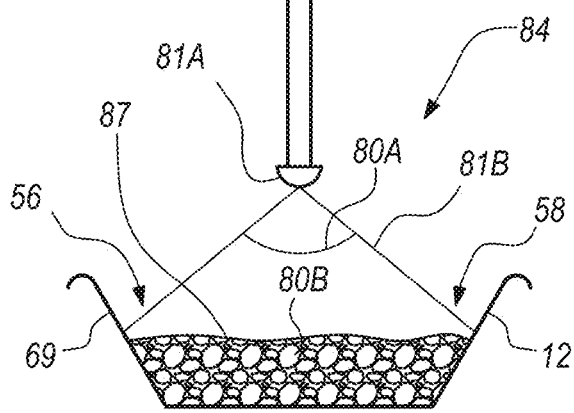
FIG. 6 is an elevation view of an optical interface sensor that can be used in an alternate embodiment of the method and system of the present invention, the optical interface sensor for detecting the interface width of the stream of raw food portions in the upstream conveyor.

FIG. 6 is an elevation view of an alternate interface sensor 81A for detecting the interface width of the stream of raw food portions 87 in the upstream conveyor 12. FIG. 6 illustrates how a cross-sectional flow area of the raw food portions 87 on the upstream conveyor 12 can also be empirically determined or calculated based on the width of the interface 80B. For example, as shown in FIG. 6, an optical interface width sensor 81A may be used to detect the interface width 80B from a first side 56 of the upstream conveyor 12 to a second side 58 of the upstream conveyor 12 where the interface width 80B engages the first side 56 and the second side 58. This width may be determined using the measurement of an angle 80A formed between the engagement at the first side 56 and the engagement of the second side 58 detected by an optical instrument 81A positioned at a known height above a floor of the upstream conveyor 12. The cross-sectional flow area of the stream of raw food portions 87 corresponding to the detected interface width 80B, an empirically determined weight of the stream of raw food portions 87 per unit length for that interface width 80B, and the observed speed at which the stream of raw food portions 87 moves along the upstream conveyor 12 can together be used to calculate the mass rate flow of raw food portions 87 moving within the upstream conveyor 12 to the mixing station 30 (not shown) fed by the upstream conveyor 12.

Figure 7:
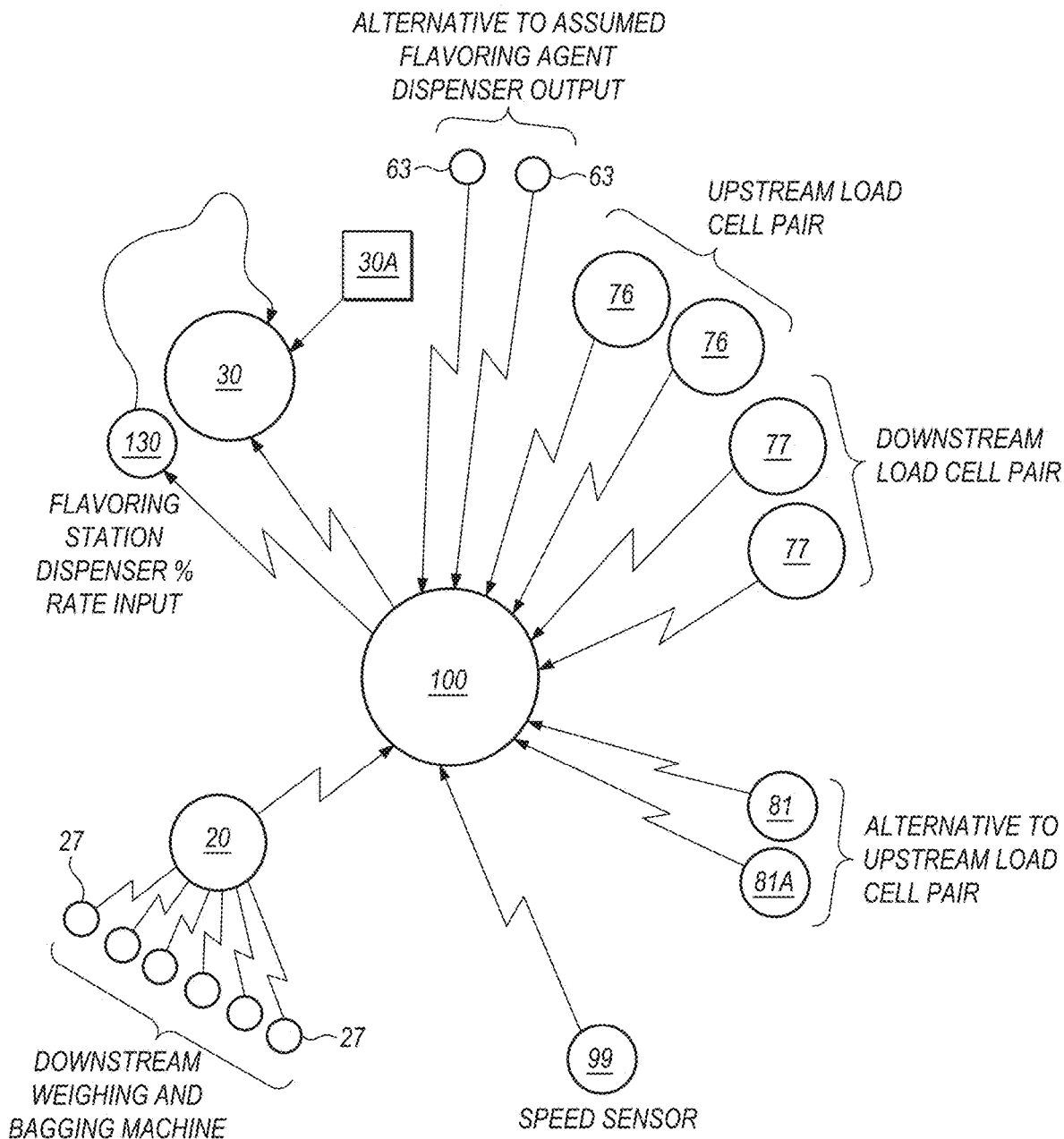
FIG. 7 is a diagram illustrating the use of signals generated by speed sensors, an upstream ultrasonic interface detector, a loss-of-weight (flavoring agent) dispenser and a high-fidelity weighing machine, and for receiving input from keyboard used to generate signals corresponding to an empirically determined density of the food portions and an assumed percentage mass rate for the loss-of-weight (flavoring agent) dispenser, and to generate signals to a processor that provides a computer-implemented method for improving the consistency and uniformity of flavored food portions (blend) in accordance with an embodiment of the method and system of the present invention.

FIG. 7 is a diagram illustrating the use of speed sensors, an upstream ultrasonic height or width interface detector, an empirically determined density of the raw food portions on the upstream conveyor, and an assumed percentage mass rate for the flavoring agent dispenser to generate signals to a processor that provides a computer-implemented method for improving the consistency and uniformity of flavored food portions in accordance with an embodiment of the present invention.

A processor 100 receives electronic signals, the signals being transmitted to the processor 100 by devices wirelessly, by wire, or both, and the processor 100 generates signals to other devices. FIG. 7 illustrates an upstream load cell pair 76 and 77 generating signals corresponding to the load imparted to the upstream load cell pair 76 and 77 at the upstream weighing machine 14 of the upstream conveyor 12 shown in FIGS. 1-3, and FIG. 7 illustrates a plurality of load cells 27 of the high-fidelity weighing machine 20 generating signals to the processor 100 that correspond to the mass of flavored food portions in each bag and the number of bags produced at the high-fidelity weighing machine 20 in FIG. 1 and FIGS. 4A-4D.

In the system illustrated in FIG. 7, a set of signals are generated by one or both of an ultrasonic height interface sensor 81 and an optical interface width sensor 81A instead of or in addition to the upstream load sensors 76 and 77 in the event that a volumetric flow rate is to be generated and then converted to a mass flow rate of raw food portions 87 delivered by the upstream conveyor 12 to the mixing station 30, that volumetric flow rate being converted to a total mass or mass flow rate by multiplying by an empirically determined density, for the total mass, further multiplying by the duration of the time interval of interest.

The processor 100 illustrated in FIG. 7 may be programmed to generate a signal corresponding to an input percentage mass rate at which flavoring agents are to be dispensed onto the food portions delivered by the upstream conveyor 12 to the mixing station 30 or, optionally, the percentage mass rate at which flavoring agents are to be dispensed onto raw food portions 87 delivered by the upstream conveyor 12 to the mixing station 30 may be input directly into a dedicated keypad 30A electronically coupled to deliver a corresponding signal to the dispensation devices in the mixing station 30. The processor 100 illustrated in FIG. 7 generates a correction factor and delivers a corresponding signal to an input module 130 coupled to condition or correct the percentage mass rate input to the mixing station 30 to bring the upstream total mass or mass rate measurement into harmony with the total mass rate or percentage mass rate at which flavoring agents are applied to the food portions 87 delivered into the mixing station 30 by the upstream conveyor 12 and the measurements of the high-fidelity weighing machine 20. It will be understood that the embodiment of the processor 100 and the devices feeding signals into the processor 100 and the devices receiving signals from the processor 100 shown in FIG. 7 illustrate only one system that can implement an embodiment of a method of the present invention and other embodiments may be illustrated in other ways.

Figure 8:
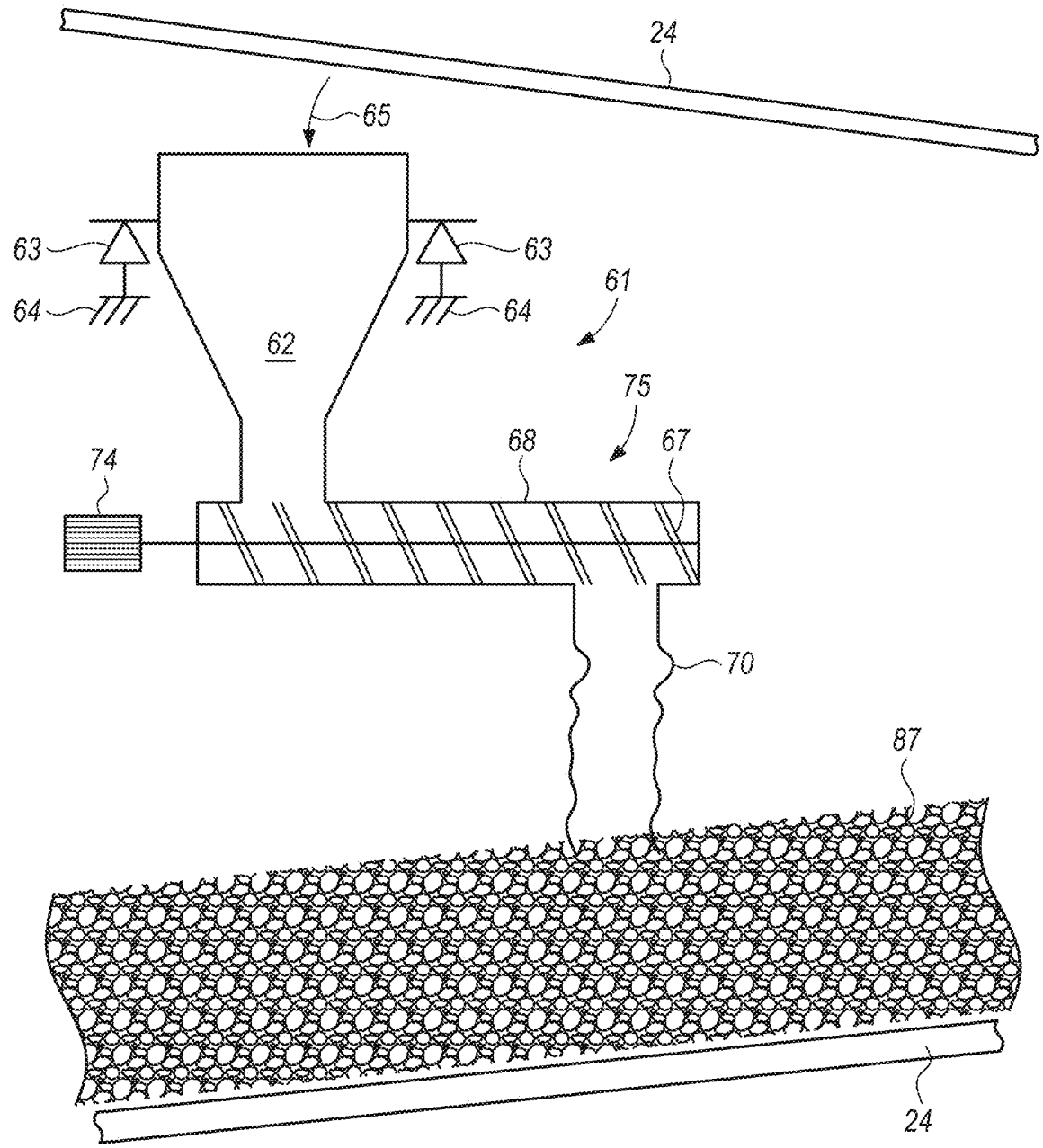
FIG. 8 is an elevation view of a loss-of-weight type flavoring dispenser that can be used in embodiments of the method and system of the present invention to achieve increased accuracy and control of the amount of a flavoring agent dispensed onto raw food portions in the tumble drum of the flavoring station.

FIG. 8 is an elevation view of a loss-of-weight type flavoring agent dispenser 61 that can be used in embodiments of the method and system of the present invention to achieve increased accuracy and control of the amount of flavoring agent 70 that is dispensed onto raw food portions 87 in the tumble drum 24 of the mixing station 30. The loss-of-weight flavoring agent dispenser 61 measures the amount of flavoring agent 70 that is dispensed onto the raw food portions 87 by using load cells 63 coupled intermediate supports 64 and an assembly including a hopper 62 and an augur 67 having a sleeve 68 and an augur 67 rotatable within the sleeve 68 by a motor 74. The flavoring agent 70 is loaded into a top opening 65 of the hopper 62. The flavoring agent 70 is gravity-fed into the sleeve 68 and displaced by rotation of the augur 67 from the sleeve 68 to be discharged onto the raw food portions 87. Signals generated by the load cells 63 as the weight of the assembly (hopper 62, augur 67 and sleeve 68) decreases due to dispensation of the flavoring agent 70 therefrom are transmitted to the processor 100 which, in turn, can generate control signals back to the loss-of-weight flavoring agent dispenser 61 to adjust the dispensation rate, as illustrated in FIG. 7.

Further improvements in the accuracy of measurements of the total mass or mass flow rate at which raw food portions 87 are conveyed to the mixing station 30 and one or more flavoring agents are dispensed thereon can be achieved by strategically matching the total mass or mass rate measurements obtained using embodiments of the method and system 10 of the present invention. More specifically, additional accuracy in correcting total mass or mass flow rate measurements can be obtained by temporally matching accurate data obtained using the high-fidelity weighing machine 20 with data obtained using the upstream weighing machine 14 of the upstream conveyor 12. This additional accuracy is obtained because it reduces or eliminates the impact of variations in the total mass or mass flow rate at which raw food portions 87 may be delivered to the mixing station 30, and data obtained using the high-fidelity weighing machine 20 relate to the same raw food portions 87 that resided on the upstream weighing machine 20 at the time that the upstream weighing machine 14 was used to obtain the measurements that are to be corrected.

Figure 9:
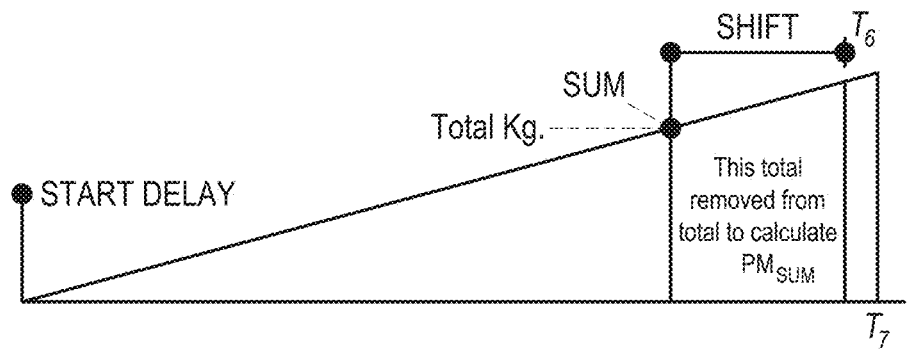
FIG. 9 is a graph illustrating the mass flow rate of raw food portions introduced from a distribution conveyor to the upstream conveyor and moving across an upstream weighing machine of an embodiment of a method and system of the present invention.
Figure 10:
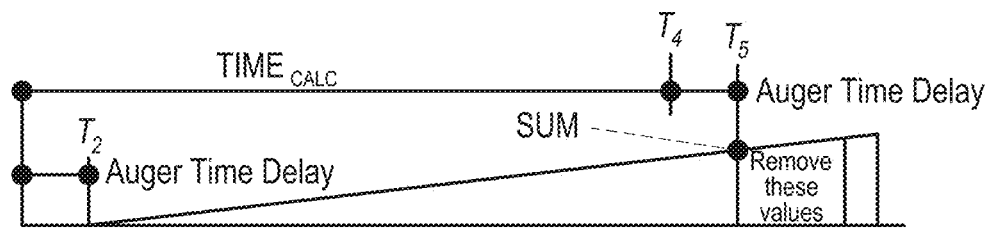
FIG. 10 is a graph illustrating the mass flow rate of second component materials from the loss-of-weight dispenser being introduced into the first component of an embodiment of the method and system of the present invention.
Figure 11:
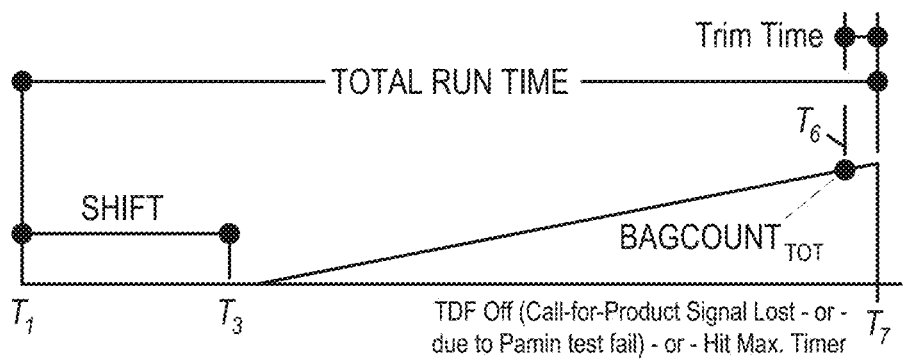
FIG. 11 is a graph illustrating the mass flow rate of flavored food portions, after flowing through a mixing station, discharged from the high-fidelity weighing machine of an embodiment of a method and system of the present invention.

The need for comparing measurements obtained over different time intervals at the upstream weighing machine, 14 and the high-fidelity weighing machine 20 is illustrated in FIGS. 9-11 which are three separate but related graphs showing time along the axis and total mass along the ordinate. As illustrated in FIGS. 9-11, initially, at time to, the upstream conveyor 12, the upstream weighing machine 14, the flavoring station 30 and the loss-of-weight dispenser 61 therein, and the high-fidelity weighing machine 20 are all inactive and there are no raw food portions 87 or flavored food portions 88 on any of these pieces of equipment. It will be understood that the absence of raw food portions 87 or flavored food portions 88 facilitates the thorough cleaning of the equipment between production runs. When a production run is desired, the first occurrence, at $t_0$, is that the processor 100 of the system 10 generates and sends a call-for-product signal to a flow valve in a raw food portion distribution conveyor (not shown) such as, for example, a side-discharging flow valve, to open to pour or spill raw food portions from a distribution conveyor onto the upstream conveyor 12 which is activated to convey and deliver raw food portions 87 across the upstream weighing machine 14 and to the mixing station 30. It can be seen in FIG. 9 that the total mass introduced through the flow valve from the distribution conveyor (not shown) to the upstream conveyor 12 begins to reach the upstream weighing machine 14 at $t_1$ and that the measured total mass of raw food portions 87 begins to ramp upwardly at $t_1$ at a steady rate indicated by the unchanging slope of the line that represents the total mass measured. Immediately upon receiving raw food portions 87 from the open valve, the upstream conveyor 12 begins moving the raw food portions 87 towards the upstream weighing machine 14 and further to the mixing station 30, and the raw food portions 87 reach the mixing station 30 at $t_2$. At $t_2$, the first or leading raw food portions 87 that have been weighed using the upstream weighing machine 14 reach the mixing station 30 and the loss-of-weight dispenser begins to dispense flavoring agents onto the raw food portions 87. The total mass of dispensed flavoring agents begins to ramp upwardly at a steady rate indicated by the unchanging slope of the line in FIG. 10 starting at $t_2$. Finally, after more time, raw food portions 87 that are introduced into the mixing station 30 to be mixed with one or more flavoring agents dispensed thereon begin to be discharged to the high-fidelity weighing machine 20 at $t_3$. The total mass of flavored food portions delivered into the high-fidelity weighing machine ramps upwardly at a steady rate indicated by the unchanging slope of the line in FIG. 11 at $t_3$. It is important to note that FIGS. 9-11 represent an idealized situation where the mass flow rate is steady, and that the lines in FIGS. 9-11 may, in more realistic scenarios, have variations in the slope indicating that there are variations of the mass flow rate at which product flows. The lines, whether of unchanging slope or variable slope, should generally have a similar profile since the mass flow rate at which flavoring agents are dispensed should be a steady percentage rate of the mass flow rate at which raw food portions 87 enter the mixing station 30, and the mass flow rate at which flavored food portions 88 are weighed and bagged at the high-fidelity weighing machine 20 should reflect the mass flow rate at which the raw food portions 87 are discharged to the mixing station 30 added to the mass flow rate at which flavoring agents are dispensed onto the raw food portions 87 in the mixing station 30.

It is important that the measurement of the total mass of flavored food portions to be measured at the high-fidelity weighing machine 20 starting at $t_3$ and ending at $t_6$ be compared not to the total mass of raw food portions 87 measured using the upstream weighing machine 14 of the upstream conveyor 12 at starting at that same moment, $t_3$ and ending at $t_6$ but, instead, that the total mass of flavored food portions to be measured at the high-fidelity weighing machine 20 starting at $t_3$ and ending at $t_6$ be compared to the total mass of raw food portions 87 measured using the upstream weighing machine 14 of the upstream conveyor 12 starting at $t_1$ and ending at $t_4$ which reflects the time interval when those flavored food portions 88 weighed and bagged in the high-fidelity weighing machine 20 resided on the upstream weighing machine 14. Similarly, it is important that the measurement of the total mass of flavored food portions to be measured at the high-fidelity weighing machine 20 starting at $t_3$ and ending at $t_6$ be compared not to the total mass of flavoring agents measured using the loss-of-weight dispenser starting at that same moment, $t_3$ and ending at $t_6$ but, instead, that the total mass of flavored food portions to be measured at the high-fidelity weighing machine 20 starting at $t_3$ and ending at $t_6$ be compared to the total mass of flavoring agents dispensed and measured using the loss-of-weight dispenser starting at $t_2$ and ending at $t_5$ which reflects the time interval when those flavored food portions 88 weighed and bagged in the high-fidelity weighing machine 20 resided in the flavoring station 30.

The equipment, instruments, sensors and processor described above in relation to the embodiment of the method and system illustrated in FIGS. 1-11 are provided, interconnected and programmed for the purpose of generating correction factors that enable the highly accurate measurements provided by the high-fidelity weighing machine 20 to be used to correct the measurements made using the upstream weighing machine 14 of the upstream conveyor 12 and to correct the measurements made using the loss-of-weight dispenser in the mixing station 30. For example, but not by way of limitation, and assuming we are using a load cell-based upstream weighing machine 14, the high-fidelity weighing machine 20 may measure a total mass of 25 kg produced during a run ($t_3$ to $t_6$) lasting a total of 3 minutes. During the time interval from $t_1$ to $t_4$, which by definition is also 3 minutes, the upstream weighing machine 14 takes 720 measurements, one every 250 milliseconds of the 3 minute time interval of interest, and the processor 100 computes the total mass of the raw food portions 87 (i.e., first component material portions which may be, for example, cooked potato chips) crossing the upstream weighing machine 14 and moving downstream towards the mixing station 30 of 22 kg. During the time interval from $t_2$ to $t_5$, which by definition is also 3 minutes, the loss-of-weight dispenser measures a total mass of 2.6 kg of the flavoring agents (i.e., the second component material) onto the raw food portions 87 (i.e., the first component material) in the mixing station 30. The desired blend is 90% by weight raw food portions 87 and 10% by weight flavoring agents and is input into the processor 100 using a keypad 30A.

The correction of the total mass of the raw food portions 87 crossing the upstream weighing machine 14 is done by the following process. Assuming that the observed speed of movement of the raw food portions 87 on the upstream weighing machine 14 is 8 meters per minutes (which can vary slightly due to surface characteristics) and the length of the conveyor section of the upstream weighing machine 14 is 0.5 meters, and assuming further a historical correction factor, K, retrieved by the processor 100 from the historical database is equal to the default value of 1.00, and assuming the total of the 720 instantaneous mass measurements (at 250 millisecond intervals) are summed by the processor 100 to 330 kg, the total mass of raw food portions passing across the upstream weighing machine 14 is calculated using the following formula:_PMsum=(330 kg×8 m/minute×1.0)/(0.5 m×60 sec/minute×4 samples/second), or an uncorrected total mass of raw food portions 87 crossing the upstream weighing machine 14 of PMsum=22 kg of raw food portions 87. The determination of the total mass of the flavoring agents dispensed by the loss-of-weight dispenser in the mixing station 30 is much simpler than the determination of the of the total mass of the first component material portions 87 crossing the upstream weighing machine 14. The loss-of-weight dispenser generates and sends a signal to the processor 100 corresponding to an uncorrected total mass of dispensed flavoring agents of 2.6 kg. Comparing the uncorrected total mass of raw food portions 87 of 22 kg to the highly reliable measurement of the total mass of flavored food portions 88 at the high-fidelity weighing machine 20, and taking into account that the targeted (or input) weight percentage of raw food portions 87 to the flavored food portions 88 is 90%, we calculate the ratio of the raw food portions 87 to flavored food portions 88 measured during the time shifted and correlated time intervals of interest as 22 kg/25 kg=0.88 or 88%. The ratio is compared to the target ratio of 90%, and the error between the measured ratio and the target ratio is used to adjust the calculation for subsequent measurements. In this case, the correction factor (K) would be 90/88 or 1.023 to be stored in the historic database and thereafter, until a new correction factor is determined, used to compensate measurements taken by the upstream weighing machine 14 to harmonize those measurements with the highly accurate high-fidelity weighing machine 20 and to thereby improve the consistency with which the raw food portions 87 and the flavoring agents are mixed together. Similarly, the ratio for the flavoring agents is calculated as 2.6 kg/25 kg=0.104 or 10.4%. This ratio is compared to the target ration of 10%. The error between the measured ratio and the target ratio is used to adjust the calculation for subsequent measurements. In this case, the correction factor (FT) would be 10/10.4 or 0.962 to be stored in the historic database and thereafter, until a new correction factor is determined, used to compensate measurements taken by the loss-of-weight to harmonize those measurements with the highly accurate high-fidelity weighing machine 20 and to thereby improve the consistency with which the raw food portions 87 and the flavoring agents are mixed together.

The foregoing system, and other systems for controlling and for implementing embodiments of the method of the present invention may include computer program product code, and such code may further include computer readable program code for implementing or initiating any one or more aspects of the methods described herein. Accordingly, a separate description of the methods will not be duplicated in the context of a computer program product.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method of correcting the measurement of the mass flow rate at which a conveyed stream of first component material portions is moved to a mixing station in which a second component material is added to the stream of first component material portions, the method comprising:

providing a conveyor having an upstream end to receive a stream of the first component material portions and a downstream end at which the stream of the first component material portions is discharged;

providing an upstream weigher intermediate the upstream end and the downstream end of the conveyor for measuring a mass of first component material portions residing on the upstream weigher, the upstream weigher having a signal generator for generating a signal corresponding to each measurement of the mass of first component material portions residing on the upstream weigher;

providing a processor for receiving the signal generated by the signal generator of the upstream weigher;

providing a targeted percentage at which the second component material is to be mixed with the first component material to provide a targeted blend;

generating a signal to the processor corresponding to the targeted percentage;

providing a mixing station at which a stream of second component material portions is to be dispensed using a dispenser onto the stream of first component material portions received into the mixing station from the downstream end of the conveyor for mixing therewith to form a stream of blended product;

providing a high-fidelity weighing machine to receive the stream of blended product from the mixing station and to deposit a predetermined mass amount of the blended product into each of a plurality of packages in which the blended product is packaged, the high-fidelity weighing machine having a signal generator for generating signals to the processor corresponding to the number of packages of blended product packaged by the high-fidelity weighing machine in a given time interval;

providing a variable rate dispenser in the mixing station to controllably dispense the stream of second component material portions onto the stream of first component material portions at a rate that obtains the targeted percentage to enable the mixing of the first component material portions and the second component material portions into a stream of flavored food portions, the rate at which the second component material portions are dispensed being controlled using a signal from the processor;

determining the time required for first component material portions to move on the conveyor from the upstream weigher to the mixing station using one of a speed sensor and human observation;

generating a signal to the processor corresponding to the speed at which the first component material portions move from the upstream weigher to the mixing station;

determining a residence time during which first component material portions remain within the mixing station while being mixed with the second component material portions;

generating a signal to the processor corresponding to the residence time during which first component material portions remain within the mixing station while being mixed with the second component material portions;

determining the time required for blended product to move from the mixing station to the high-fidelity weighing machine using one of a speed sensor and human observation;

generating a signal to the processor corresponding to the time required for blended product to move from the mixing station to the high-fidelity weighing machine;

determining a time shift between the moment that a first component material portion resided on the upstream weigher and the time that the first component material portion entered the mixing station;

generating a signal to the processor corresponding to the time shift between the moment that a first component material portion resided on the upstream weigher and the time that the first component material portion entered the mixing station;

determining a time shift between the moment that a blended first component material portion with second component material portion blended therewith exited the mixing station and the time that the first component material portion entered the mixing station;

generating a signal to the processor corresponding to the time shift between the moment that a blended first component material portion with second component material portion blended therewith exited the mixing station and the time that it reaches the high-fidelity weighing machine;

assuming an initial correction factor for being applied to the measurements made using the upstream weigher as being one of 1.0 or a previously determined correction factor stored in and retrieved by the processor from a database;

using the time shifts to identify and select one or more previous measurements of the mass of first component material portions residing on the upstream weigher that correspond to one or more measurements of mass of blended product produced by mixing those same first component material portions with dispensed second component material portions added in the mixing station; and determining a new correction factor by comparing the measurements obtained using the high-fidelity weighing machine with the identified, selected and time-shifted measurements made using the upstream weigher, the correction factor being determined as a number that, when applied to correct the measurements made using the upstream weigher, brings the measurements into harmony with the measurements made using the high-fidelity weighing machine.

2. The method of claim 1, wherein the upstream weigher include load cells and a section of the conveyor supported thereon to enable the determination of mass of the conveyor section and the first component material portions thereon.

3. The method of claim 1, further including a loss-of-weight dispenser in the mixing station for dispensing a stream of second component material portions onto the stream of first component material portions at a predetermined rate of dispensation, the loss-of-weight dispenser including a reservoir of known mass into which a charge of second component material portions is placed, the reservoir supported on one or more load cells coupled to a signal generator for generating a signal to the processor corresponding to the mass of the reservoir and the second component material supported therein.

4. The method of claim 3, further including:
assuming an initial correction factor for being applied to the measurements made using the loss-of-weight dispenser as being one of 1.0 or a previously determined correction factor stored in and retrieved by the processor from a database;

using the time shifts to identify and select one or more previous measurements of the mass of second component material portions dispensed in the mixing station that correspond to one or more measurements of mass of blended product produced by mixing those same dispensed second component material portions with first component material portions in the mixing station; and determining a new correction factor by comparing the measurements obtained using the high-fidelity weighing machine with the identified, selected and time-shifted measurements made using the loss-of-weight dispenser, the correction factor being determined as a number that, when applied to correct the measurements made using the loss-of-weight dispenser, brings the measurements into harmony with the measurements made using the high-fidelity weighing machine.

5. The method of claim 1, wherein the processor determines the number of bags, containers or packages of the blend produced within a given time interval, and wherein that number times the mass of the blend deposited into each package is used to provide the total mass of the blend discharged from the mixing station to the high-fidelity weighing machine during a time interval of interest, is the total mass being equal to the total mass of first material component portions plus the total mass of the second component material mixed therewith to produce the blend.

6. The method of claim 1, wherein the processor determines the number of packages produced and an average weight of the packages, and the number of packages produced and the average weight of the packages are used to determine a total mass of the blend discharged from the mixing station to the high-fidelity weighing machine.

* * * * *